United States Patent
Nakano et al.

(10) Patent No.: US 6,938,043 B2
(45) Date of Patent: *Aug. 30, 2005

(54) DATABASE PROCESSING METHOD, APPARATUS FOR IMPLEMENTING SAME, AND MEDIUM CONTAINING PROCESSING PROGRAM THEREFOR

(75) Inventors: Yukio Nakano, Oyama (JP); Morihiro Iwata, Tama (JP); Susumu Kobayashi, Kawasaki (JP); Masashi Tsuchida, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,454

(22) Filed: Dec. 3, 2003

(65) Prior Publication Data

US 2004/0111442 A1 Jun. 10, 2004

Related U.S. Application Data

(63) Continuation of application No. 10/242,441, filed on Sep. 13, 2002, now Pat. No. 6,728,710, which is a continuation of application No. 09/452,172, filed on Dec. 1, 1999, now Pat. No. 6,505,199.

(30) Foreign Application Priority Data

Dec. 1, 1998 (JP) .......................................... 10-341964

(51) Int. Cl.[7] ............................................. G06F 17/30
(52) U.S. Cl. ...................................... 707/10; 707/104.1
(58) Field of Search ....................... 707/3, 8, 10, 103 R, 707/104.1; 709/201, 203, 219, 217

(56) References Cited

U.S. PATENT DOCUMENTS

| | | | | |
|---|---|---|---|---|
| 6,012,067 A | * | 1/2000 | Sarkar | 707/103 R |
| 6,088,694 A | * | 7/2000 | Burns et al. | 707/8 |
| 6,505,199 B1 | * | 1/2003 | Nakano et al. | 707/8 |
| 6,728,710 B2 | * | 4/2004 | Nakano et al. | 707/8 |

OTHER PUBLICATIONS

"Datalinks: Managing External Data with DB2 Universal Database" by InfoIT, Inc., Aug. 1997, pp. 10–11.

* cited by examiner

*Primary Examiner*—Apu M Mofiz
(74) *Attorney, Agent, or Firm*—Mattingly, Stanger, Malur & Brundidge, P.C.

(57) ABSTRACT

A database processing method for defining and operating data of file reference type which references a file. A column data insert request for specifying position information indicative of a storage location of a file and watch information for watching the file is received from a database client. A request for watching a file indicated by the position information is issued in accordance with the watch information. The position information and the watch information are stored in a database. The foregoing operations permit data in an external file placed outside a database to be treated as data equivalent to ordinary column data stored in the database to improve the integrity of the database.

12 Claims, 27 Drawing Sheets

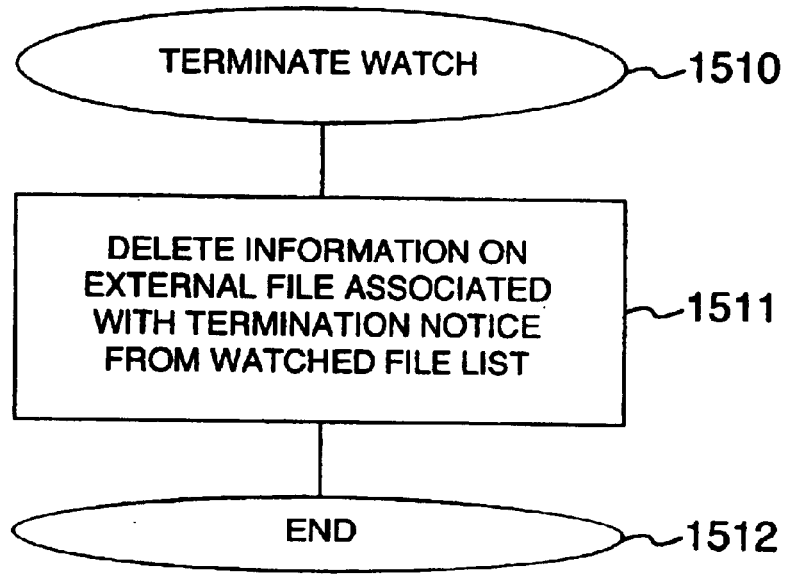
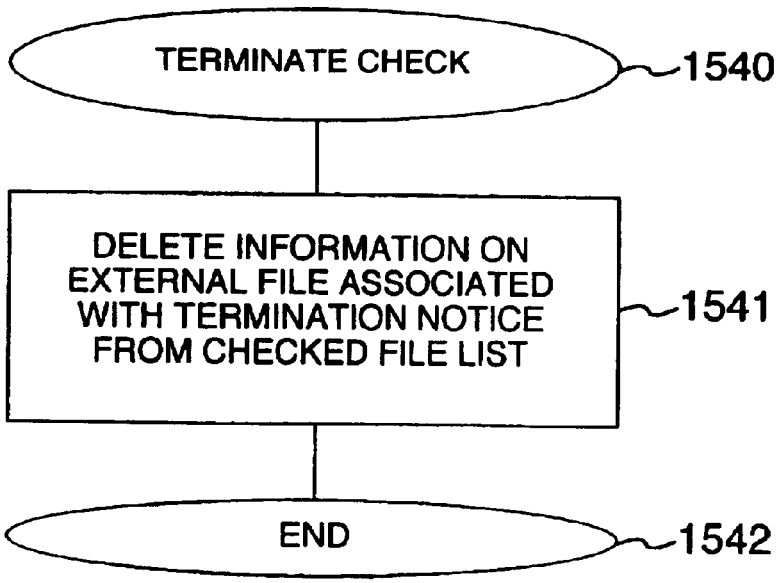

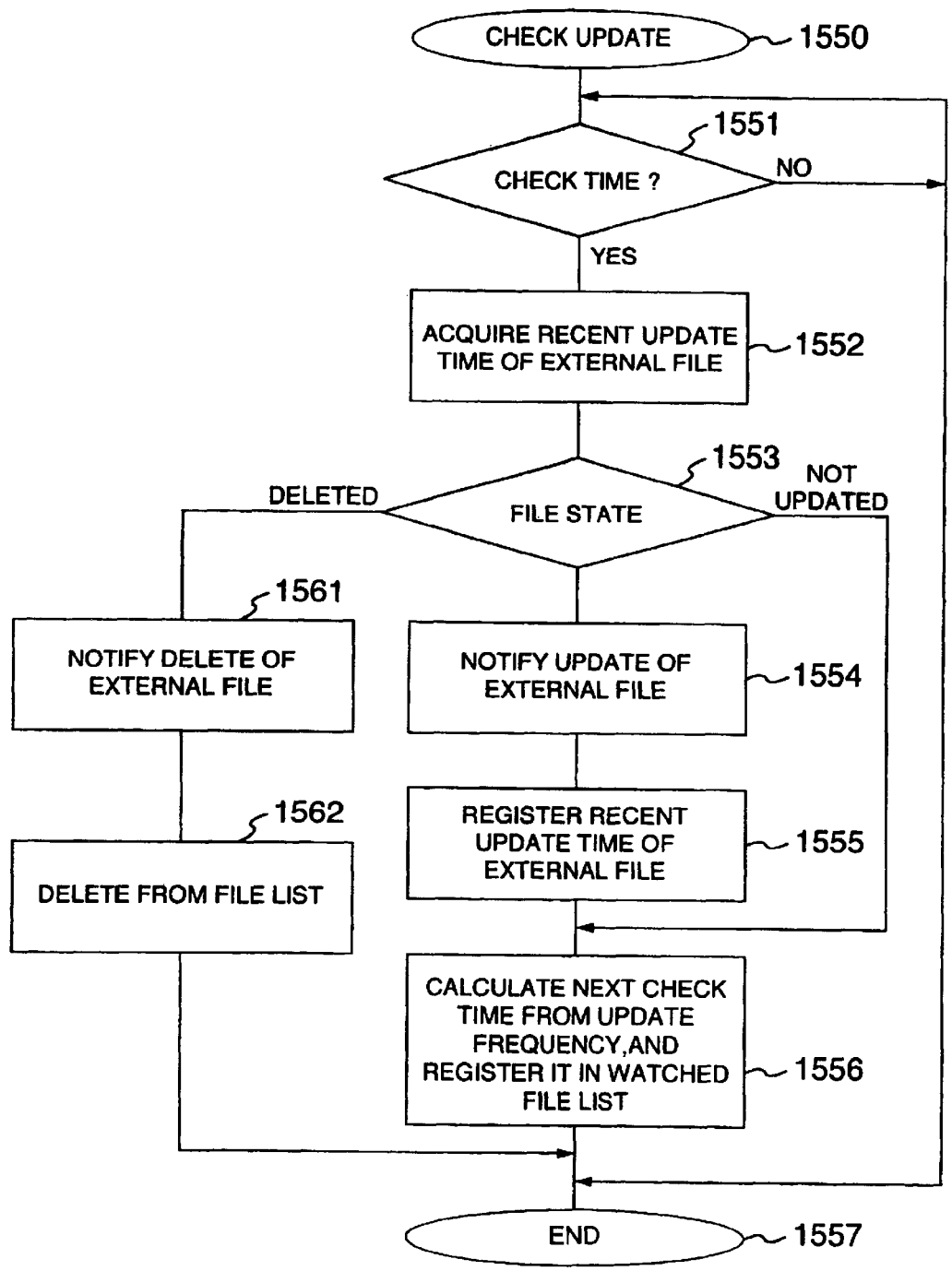

DATABASE PROCESSING METHOD, APPARATUS FOR IMPLEMENTING SAME, AND MEDIUM CONTAINING PROCESSING PROGRAM THEREFOR

The present application is a continuation of application Ser. No. 10/242,441, filed Sep. 13, 2002; now U.S. Pat. No. 6,728,710, which is a continuation of application Ser. No. 09/452,172, filed Dec. 1, 1999, now U.S. Pat. No. 6,505,199, the contents of which are incorporated herein by reference.

BACKGROUND OF THE INVENTION

The present invention relates generally to a database processing system which references files, and more particularly to a technology which is effectively applied to a database processing system that executes definitions and operations for data of file reference type capable of referencing a file so as to improve the integrity of a database (DB).

A database management system (hereinafter abbreviated as the "DBMS"), particularly a relational DBMS, processes queries which are expressed in a non-procedural language. The SQL (Structured Query Language) has been employed as this database language. At present, the standardization is under progress for next generation SQL (under ISO, ANSI) in the database language SQL. The reference type is one of main functions implemented in the next generation SQL. The reference type stores a pointer in a particular row in a separate table within a DB, rather than storing a value in a column. In this way, information in a referenced row can be provided as shared data.

In recent years, there has been an increasing need for employing a DBMS to manage multimedia data including texts, graphics, pictures, audio, moving image data and so on which may be accessed through WWW (World Wide Web) or the like. However, these data are generally produced and modified by their individual applications dedicated thereto, so that once data is stored within a DBMS, the data must be retrieved from and stored again in the DBMS when a dedicated application has to handle data produced thereby. To eliminate this inconvenience, an external file function has been devised for equally handling data stored in a file placed external to a DBMS, as if the data were stored in the DBMS, by indicating this external file. This external file function is supported as BFILE type in Oracle8 which is an RDBMS available from ORACLE Corporation. Also, IBM has published a similar external file function called "DataLinks" for its DB2 Universal Database (see Search Report, DataLinks: MANAGING EXTERNAL DADA WITH DB2 UNIVERSAL DATABASE, by InfoIT, Inc., pp10–11, August 1997).

As part of core capabilities, conventional DBMS's maintain the integrity, so that rows of a DB are established together with the existence of all columns, and only values in a certain column will never be missing. When a column, for which an index is defined, is updated, the index must be modified to have the most recent information. Thus, if a. conventional DBMS is simply provided with the ability of handling external files, operations such as update, delete and so on will be performed to such external files out of the management of the DBMS. Since the external files are not managed by the DBMS, the operations performed thereon will arise a problem in that the DBMS suffers from difficulties in maintaining the integrity such as that normally maintained within columns of the DBMS.

While a method of indicating an external tile 10 out of the management of a DBMS has been contemplated in the aforementioned background art techniques, the BFILE type is dedicated to reading, so that it is not recovered when a fault occurs. Moreover, the BFILE type is not a function created in consideration of an update performed outside a DBMS. DataLinks, in turn, employs a method of controlling external files such that they are not rewritten by external applications or the like which do not have an access right to a DB from which the external files may be accessed, in order to restrict accesses to external files. DataLinks, however, does not consider actions to take in the DBMS itself when an associated external file is updated.

SUMMARY OF THE INVENTION

It is therefore an object of the present invention to provide a technology which is capable of improving the integrity of a database by treating data in external files placed outside the database as data equivalent to ordinary column data stored in the database.

Specifically, the present invention provides a database processing system for defining and operating data of external file reference type capable of referencing an external file, wherein external files registered in a database are watched to check whether any file is updated or deleted, and column data within the database is updated corresponding to any processing on the external files.

In the database processing system according to the present invention, when column data is inserted, a watch request is issued in accordance with watch information in the column data for watching an external file indicated by position information in the column data. Then, the position information and the watch information in the column data are stored in the database.

When table select processing is performed, a processing type is examined in a table select request. When the processing type indicates a select of column data, the database processing system sends to a database client column data which meets a select condition. When the processing type indicates a select of the contents of an external file, the database processing system acquires the contents of an external file indicated by position information in column data, which meets the select condition, and transmits the contents to the database client.

Also, when table update processing is performed, a processing type in a table update request is examined. When the processing type indicates an update of column data, the database processing system notifies the termination of a watch on an external file indicated by position information in column data to be updated in accordance with watch information in the column data to be updated. After updating the column data to be updated with position information and watch information in the table update request, the database processing system issues a request for watching an external file indicated by the position information in the table update request in accordance with the watch information in the table update request.

When the processing type in the table update request indicates an update of contents of an external file in the table update processing, the database processing system updates the contents of an external file indicated by the position information in the column data to be updated with the contents of an external file indicted by the position information in the table update request.

When table delete processing is performed, the database processing system notifies the termination of a watch on an external file in accordance with watch information in column data to be deleted. When the processing type indicates a delete of the contents of an external file, the database processing system deletes the external file, and then the column data to be deleted.

When a request for watching an external file is issued in a manner mentioned above, the database processing system registers a watched file list with information on the external file, and initiates watching the external file. If the external file is updated or deleted, the database processing system sends to a watch requester an update notice indicating that the external file has been updated or deleted. When a watch termination notice is transmitted to terminate the watch on the external file, the database processing system deletes information on the external file associated with the watch termination notice from the watched file list.

When an update notice for the external file is sent, the contents of the update notice are examined. When the update notice indicates an update of an external file, the database processing system executes maintenance processing on an index which is registered in column data that indicates the updated external file. On the other hand, when the update notice indicates a delete of an external file, the database processing system deletes a row corresponding to column data that indicates the deleted external file, and executes maintenance processing on an index which is registered in a table.

As described above, in the present invention, the external file reference type is added to data types available in a DBMS, and position information and watch information are entered as data, so that the contents of an external file can be referenced as data linked by specified position information. The integrity of the DBMS can be maintained by watching whether any external file has been updated or deleted at a frequency specified in the watch information, and detecting any external file updated or deleted from another application or the like. It is therefore possible to treat external files as data equivalent to ordinary column data stored in a database without the need for storing the contents of external file in the DBMS.

As is appreciated from the foregoing, the database processing system according to the present invention detects an update or a delete performed on any external file indicated by position information in column data within a database, and updates column data within the database corresponding to processing performed on the external file, so that data within external files placed outside the database can be treated as data equivalent to ordinary column data stored in the database itself without damaging the integrity of the database.

BRIEF DESCRIPTION OF THE DRAWINGS

FIG. 19 is a flow chart illustrating a processing procedure for watch termination processing in the embodiment of FIG. 1;

FIG. 20 is a flow chart illustrating a processing procedure for check termination processing in the embodiment of FIG. 1;

FIG. 28 is a flow chart illustrating a processing procedure for the update check processing in the embodiment of FIG. 27.

DESCRIPTION OF THE EMBODIMENTS

The present invention will hereinafter be described in connection with a database processing system according to one embodiment thereof which executes definitions and operations on data of external file reference type data, capable of referencing external files, without damaging the integrity of a DB server.

Figure 1:
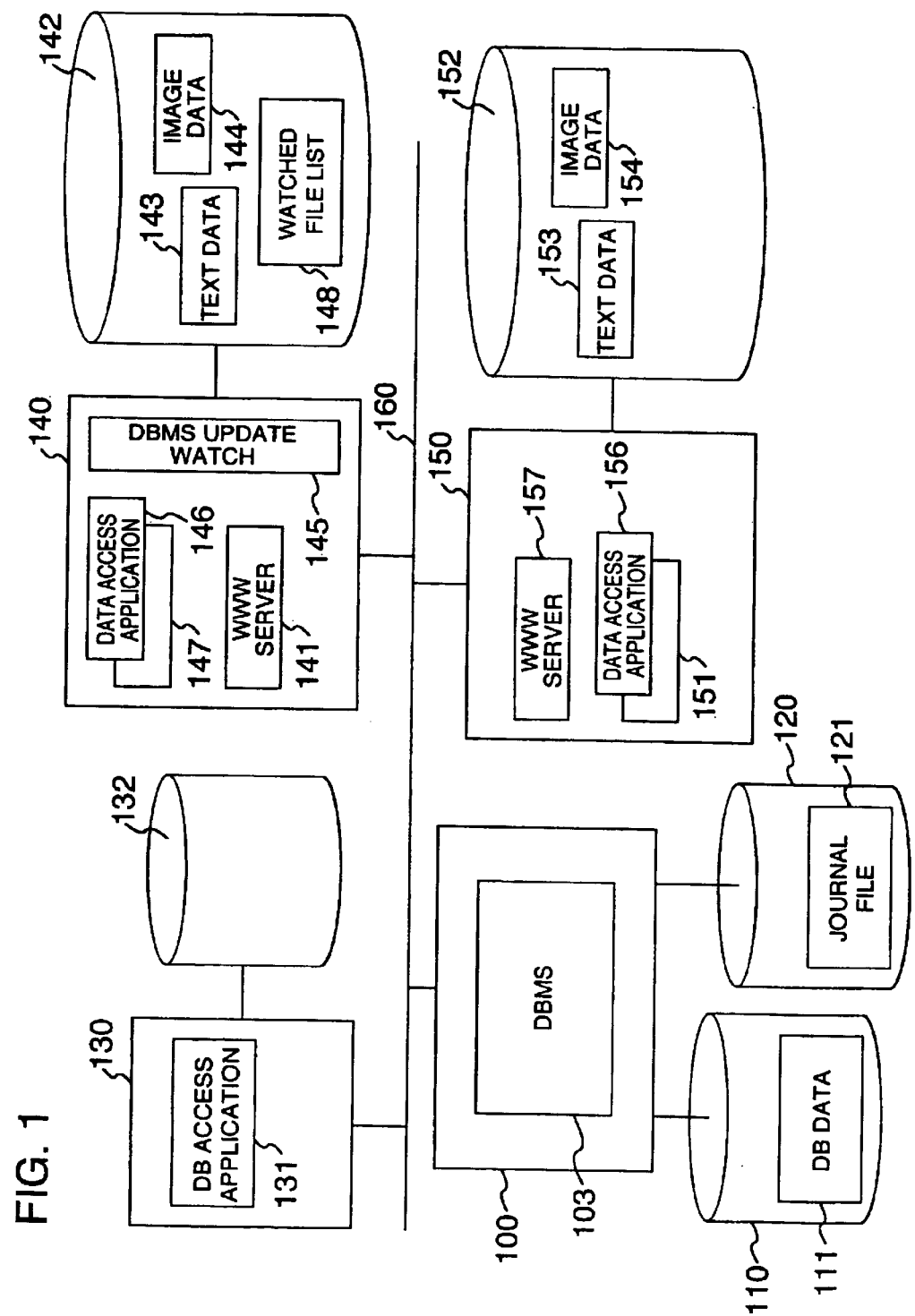
FIG. 1 is a block diagram generally illustrating the configuration of a database processing system according to one embodiment of the present invention.

FIG. 1 illustrates in block diagram form the general configuration of a database processing system according to one embodiment of the present invention. A DBMS 103 is operating in a DB server 100; a DB access application 131 in a DB client 130; a DBMS update watch processing unit 145, which forms part of functions provided by the database processing system according to this embodiment, in a file server 140; and WWW servers 141, 157 and data access applications 146, 147, 151, 156 in file servers 140, 150, respectively. These information processing devices are connected to a network 160 so that they can communicate with each other.

The DB access application 131 issues a query request to the DBMS 103 on the DB server 100 through the network 160. Upon receipt of the query request, the DBMS 103 accesses DB data 111 and a journal file 121 respectively stored in disk drives 110, 120 connected to the DB server 100 to execute processing corresponding to the query request.

The data access applications 146, 147, 151, 156 are programs for generating and processing dedicated data such as texts, images and so on. Text data and image data created by these applications are stored in disk drives 142, 152 connected to the file servers 140, 150, respectively. Text data 143, 153 and image data 144, 154 stored in the disk drives 142, 152 are open to other information processing devices through the WWW servers 141, 157, so that corresponding data may be transferred by specifying any of URLs (Uniform Resource Locator) previously assigned to the WWW servers 141 and 157 to request an access to the specified WWW server.

The DBMS update watch processing unit 145 is run in association with the DBMS 103 to watch input and output operations involved in applications such as the data access applications 146, 147 executed on the file server 140; to create a watched file list 148 as a list of files subjected to a watch requested by the DBMS 103; and to watch update processing on the files registered on the watched file list 148.

Figure 2:
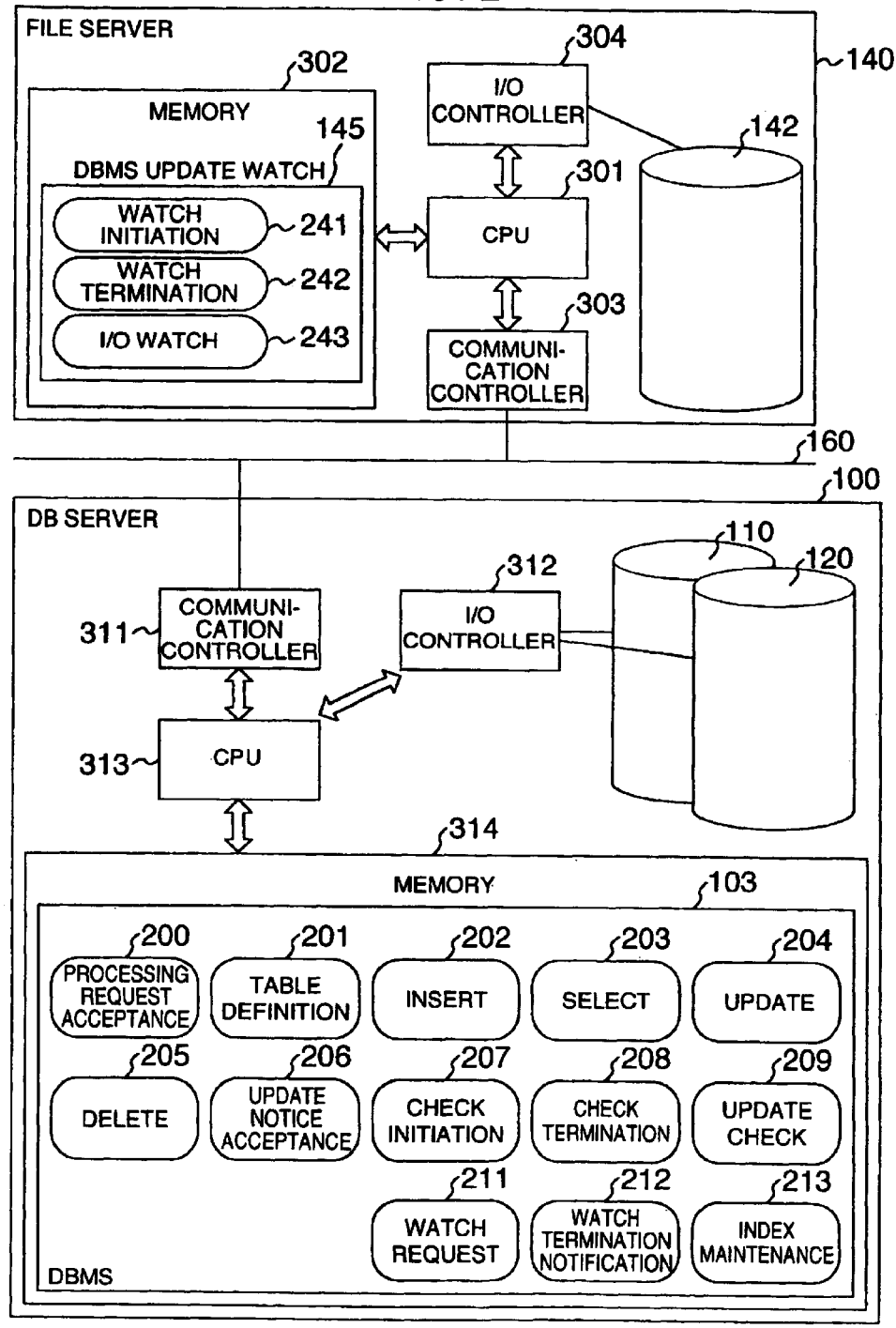
FIG. 2 is a block diagram generally illustrating the configuration of a DB server 100 and a file server 140 in the embodiment of FIG. 1.

FIG. 2 illustrates in block diagram form the general configuration of the DB server 100 and the file server 140 of this embodiment. As can be seen in FIG. 2, the DB server 100 of this embodiment comprises a processing request acceptance processing unit 200; a table definition processing unit 201; an insert processing unit 202; a select processing unit 203; an update processing unit 204; a delete processing unit 205; an update notice acceptance processing unit 206; a check initiation processing unit 207; a check termination processing unit 208; an update check processing unit 209; a watch request processing unit 211; a watch termination notification unit 212; and an index maintenance processing unit 213.

The processing request acceptance processing unit 200 is a processing unit which accepts from the DB client 130, a column data insert request; a table select request; a table update request; and a table delete request each for specifying position information indicative of a storage location of an external file; watch information for watching the external file; and a processing type which indicates which of column data and the contents of the external file are to be processed.

The table definition processing unit 201 is a processing unit which defines a table by setting a table name and the number of columns in table information within DB information; sets the table name, column names and column data types in column information within the DB information; and sets information indicative of an external file reference type in column information of an associated column if this column is specified, in the column data type, as an external file reference type capable of referencing an external file.

The insert processing unit 202 is a processing unit which stores column data including the position information and the watch information in a database. The select processing unit 203 is a processing unit for transmitting to the DB client 130 column data to be selected or the contents of an external file indicated by its position information in accordance with the contents of the processing type.

The update processing unit 204 is a processing unit which updates column data to be updated or the contents of an external file indicated by its position information in accordance with the contents of the processing type with column data in a table update request or the contents of an external file indicated by its position information.

The delete processing unit 205 is a processing unit which deletes an external file indicated by position information in column data to be deleted, and also deletes the column data to be deleted, when the processing type indicates a delete of the contents of an external file. The update notice acceptance processing unit 206 is a processing unit which receives an update notice for an external file referenced by external file reference type column data. In addition, when the update notice indicates a delete of the external file, the update notice acceptance processing unit 206 deletes a row corresponding to the column data indicating the deleted external file.

The check initiation processing unit 207 is a watch initiation processing unit which receives a watch request for requesting a watch on an external file, and registers a checked file list with information on the external file subjected to the requested watch. The check termination processing unit 208 is a watch termination processing unit which receives a watch termination notice for terminating the watch on an external file, and deletes information on the external file, associated with the received watch termination notice, from the checked file list.

The update check processing unit 209 is a watch processing unit which watches an external file registered on the checked file list, and sends to a watch requester an update notice indicative of update or delete of the external file, when the external file is updated or deleted.

The watch request processing unit 211 is a processing unit which requests a watch initiation processing unit 241 of the DBMS update watch processing unit 145 or the check initiation processing unit 207 to watch an external file indicated by position information in accordance with watch information. The watch termination notification processing unit 212 is a processing unit which notifies the termination of a watch on an external file indicated by position information to a watch termination processing unit 242 of the DBMS update watch processing unit 145 or to the check termination processing unit 208 in accordance with watch information. The index maintenance processing unit 213 is a processing unit which executes maintenance processing on indexes in accordance with an update or delete of an external file.

Programs for instructing the DB server 100 to function as the processing request acceptance processing unit 200, the table definition processing unit 201, the insert processing unit 202, the select processing unit 203, the update processing unit 204, the delete processing unit 205, the update notice acceptance processing unit 206, the check initiation processing unit 207, the check termination processing unit 208, the update check processing unit 209, the watch request processing unit 211, the watch termination notification processing unit 212, and the index maintenance processing unit 213 are assumed to be recorded on a recording medium such as a CD-ROM or the like, stored in a magnetic disk or the like from the CD-ROM, and loaded from the magnetic disk into a memory for execution. Alternatively, the programs may be recorded on any medium other than CD-ROM.

The file server 140 comprises a watch initiation processing unit 241, a watch termination processing unit 242, and an I/O watch processing unit 243.

The watch initiation processing unit 241 is a processing unit which receives a watch request for requesting a watch on an external file, and registers the watched file list 148 with information on the external file associated with the received watch request. The watch termination processing unit 242 is a processing unit which receives a watch termination notice for terminating a watch on an external file, and deletes information on the external file, associated with the received watch termination notice, from the watched file list 148.

The I/O watch processing unit 243 is a processing unit which watches an external file registered on the watched file list 148 to send to a watch requester an update notice indicative of update or delete of the external file, when the external file is updated or deleted.

Programs for instructing the file server 140 to function as the watch initiation processing unit 241, the watch termination processing unit 242 and the I/O watch processing unit 243 are assumed to be recorded on a recording medium such as a CD-ROM or the like, stored in a magnetic disk or the like from the CD-ROM, and loaded from the magnetic disk into a memory for execution. Alternatively, the programs may be recorded on any medium other than CD-ROM.

The DB server 100 comprises a CPU 313; a memory 314; an I/O controller 312; and a communication controller 311. Programs associated with the DBMS 103 stored in the memory 314 are executed by the CPU 313 to perform processing on the DBMS 103. The I/O controller 312 reads and writes data from and to the disk drives 110, 120, while the communication controller 311 transmits and receives data to and from other information processing devices interconnected through the network 160.

The DB client 130, implemented in a similar configuration, has the DB access application 131 stored in a memory for execution. When the DB access application 131 issues a query request to the DBMS 103, the query request is transmitted from the DB client 130 to the communication controller 311 of the DB server 100, and then sent to the DBMS 103. The DBMS 103 executes processing in accordance with the request. When the processing requires an access to the DB data 111, the access to the DB data 111 stored in the disk drive 110 is performed through the I/O controller 312. The processing result is transferred to the DB client 130 by the communication controller 311 and then sent to the DB access application 131, i.e., the requester.

In the file servers 140, 150, the data access applications 146, 147 stored in a memory, and the WWW servers 141, 157 are being executed. Also, in the file server 140, a program for instructing the file server 140 to function as the DBMS update watch processing unit 145 is stored in a memory 302, and is being executed. When the DBMS 103 of the DB server 100 requests the file server 140 to watch an external file, the watch request is transmitted from the communication controller 311 of the DB server 100 to a communication controller 303 of the file server 140, and then sent to the DBMS update watch processing unit 145. The DBMS update watch processing unit 145 executes processing in accordance with the request. When an external file is updated or deleted, the DBMS update watch processing unit 145 transfers an update notice to the communication controller 303 of the DB server 100 through the communication controller 311, and then sent to the DBMS 103, i.e., the requester.

Figure 3:
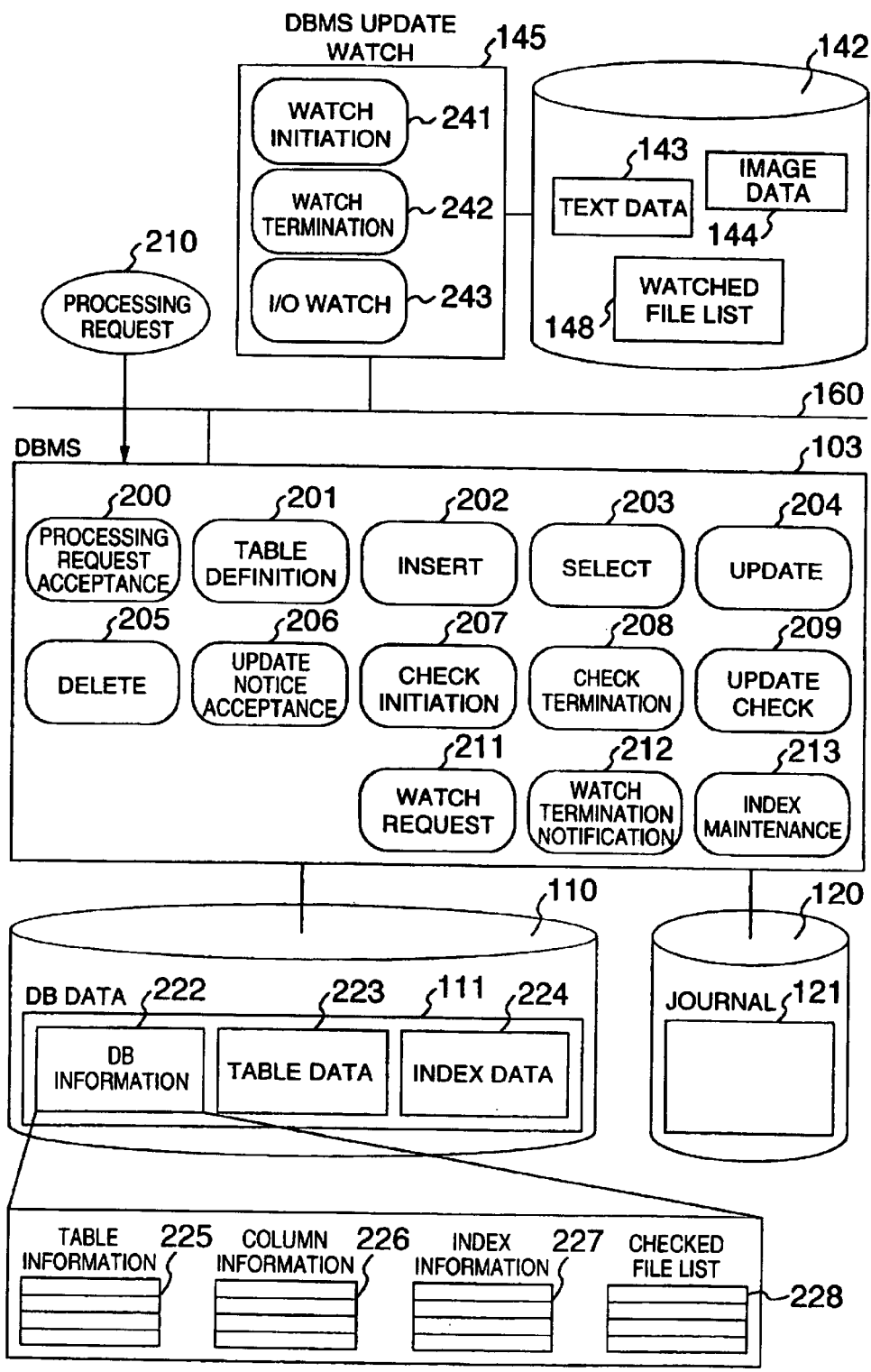
FIG. 3 illustrates an outline of the processing performed by a DBMS 103 and a DBMS update watch processing unit 145 in the embodiment of FIG. 1.

FIG. 3 illustrates an outline of the processing performed by the DBMS 103 and the DBMS update watch processing unit 145 of this embodiment. Upon receipt of a processing request 210, the DBMS 103 analyzes the request, and performs operations required for the request in cooperation with the table definition processing unit 201, the insert processing unit 202, the select processing unit 203, the update processing unit 204, and the delete processing unit 205.

The check initiation processing unit 207, the check termination processing unit 208 and the update check processing unit 209 respectively perform processing for initiating, terminating and conducting a check as to whether data has been updated in an information processing device not provided with the DBMS update watch processing unit 145, for example, in the file server 150 in FIG. 1, when the text data 153 and the image data 154 stored in the disk drive 152 are data used as data of the DBMS 103.

The watch initiation processing unit 241, the watch termination processing unit 242 and the I/O watch processing unit 243 of the DBMS update watch processing unit 145 respectively perform processing for initiating, terminating and conducting a watch as to whether data has been updated when the text data 143 and the image data 144 stored in the disk drive 142 are data used as data of the DBMS 103. The watched file list 148 stores a list of files subjected to the watch.

When the update check processing unit 209 or the I/O watch processing unit 243 detects an updated file, the update check processing unit 209 or the I/O watch processing unit 243 notifies the update notice acceptance processing unit 206 that the file has been updated.

The disk drive 110 stores DB information 222, table data 223 and index data 224 as the DB data 111, where the DB information 222 includes table information 225, column information 226, index information 227, a checked file list 228 and so on.

The table information 225 is provided with additional information when a table is created, and information such as a table name, the number of columns making up the table, a stored location, and so on are set in the table information 225 for the table. The column information 226 is likewise provided with additional information when a table is created, and information such as the name of the table organized of columns, names of columns, data types of the respective columns, and so on are set in the column information 226. The index information 227 is provided with additional information when an index is produced, and information such as the name(s) of a table and/or a column(s) for which the index is created, and so on are set in the index information 227.

The checked file list 228 is provided with additional information from the check initiation processing unit 207, and a check is made on files registered in the checked file list 228 by the update check processing unit 209. Upon termination of the check, the check termination processing unit 208 deletes information corresponding to checked files on the checked file list 228.

The table data 223 stores data of respective created tables. The select processing unit 203 retrieves column data; the insert processing unit 202 stores row data; the update processing unit 204 rewrites column values; and the delete processing unit 205 deletes a row.

The index data 224 is provided with additional information when an index is created, and information 225 on a table for which the index is created, column information 226, and so on are set in the index data 224 for the index. When an index is created, index data 224 is created and used to conduct a high speed select for data which matches a select condition specified prior to the execution of the select.

The journal file 121 in the disk drive 120 records the contents of updates and deletes performed by requests of users such that they would be used to recover the DB data 111 in case the DB data 111 was destroyed by a fault or the like.

Next, description will be made on each of functions of the DBMS 103 related to external file reference type data in the database processing system of this embodiment. Operational functions associated with the external file reference type data include table definition, insert, select, update, delete, update notice acceptance, and so on. In general, a processing request 210 is issued to the DBMS 103 which responsively executes operational functions required for the processing request.

Figure 4:
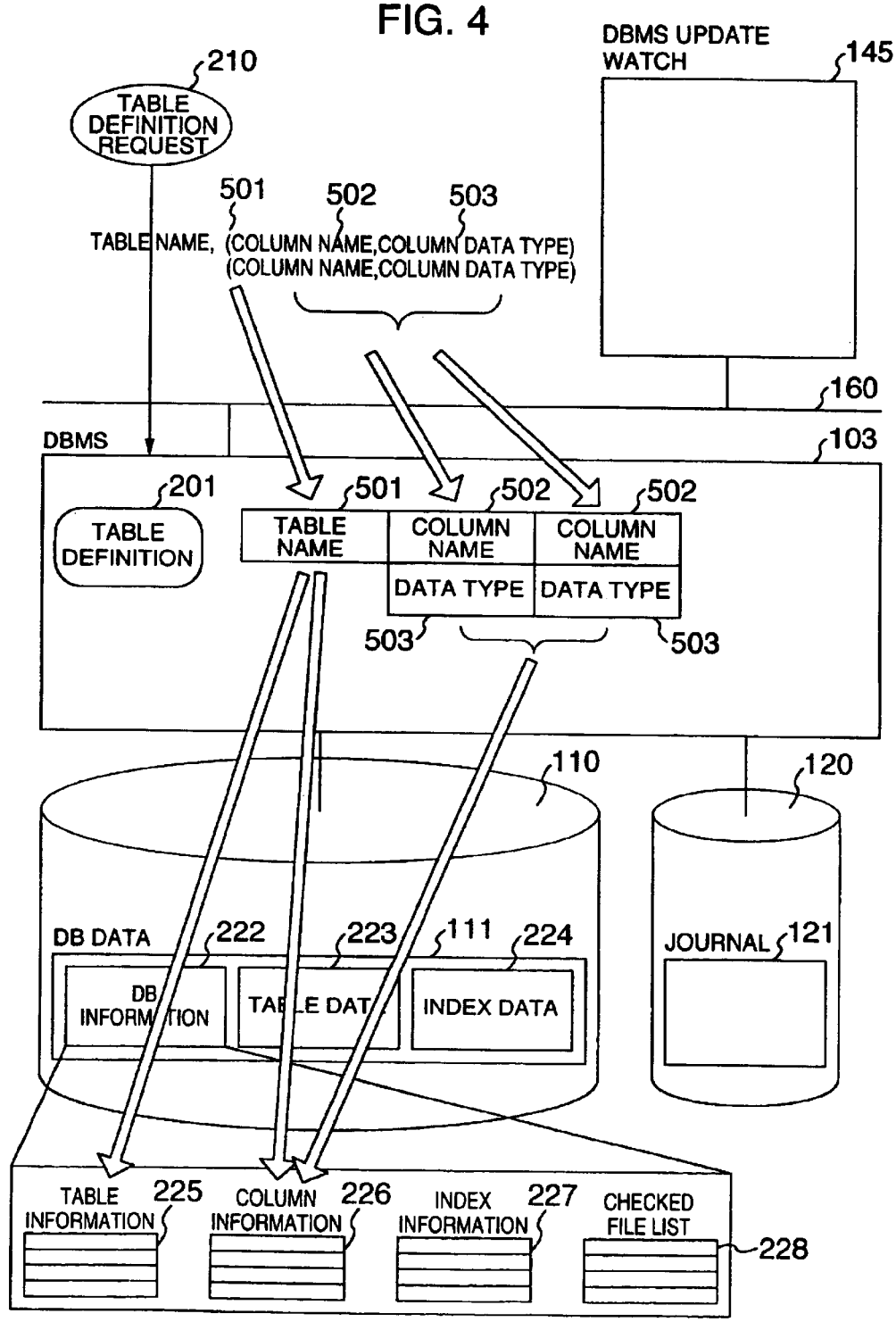
FIG. 4 illustrates an outline of table definition processing in the embodiment of FIG. 1.
Figure 5:
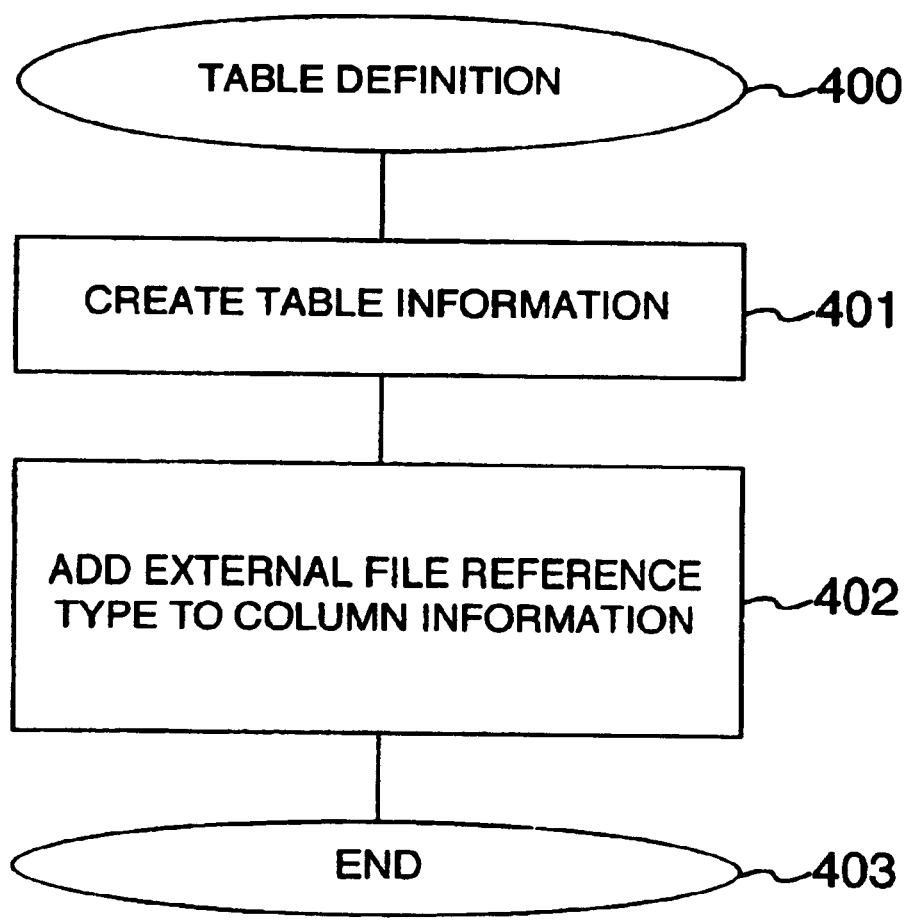
FIG. 5 is a flow chart illustrating a processing procedure for the table definition processing in the embodiment of FIG. 4.

FIG. 4 illustrates an outline of table definition processing according to this embodiment. FIG. 5 is a flow chart illustrating a processing procedure for the table definition processing according to this embodiment. The table definition processing will first be described with reference to FIGS. 4 and 5.

In FIG. 4, a processing request 210 is sent to the DBMS 103 for specifying a table name 501 of a table to be created; column names 502 of columns making up the table; data types 503 of the respective columns; and so on. For allowing a column to reference to an external file, an external file reference type is specified in the data type 503 of the column.

The processing request acceptance processing unit 200 of the DBMS 103 analyzes the processing request 210 accepted from the DB client 130, runs the table definition processing unit 201 to add the table name 501, the number of columns, and so on to the table information 225 within the DB information 222, as well as add the table name 501, the column names 502, and the column data types 503 to the column information 226 within the DB information 222 (step 401 in FIG. 5). When the external file reference type is specified for any column data type 503, information indicative of the external file reference type is added to the column information 226 (step 402).

Figure 6:
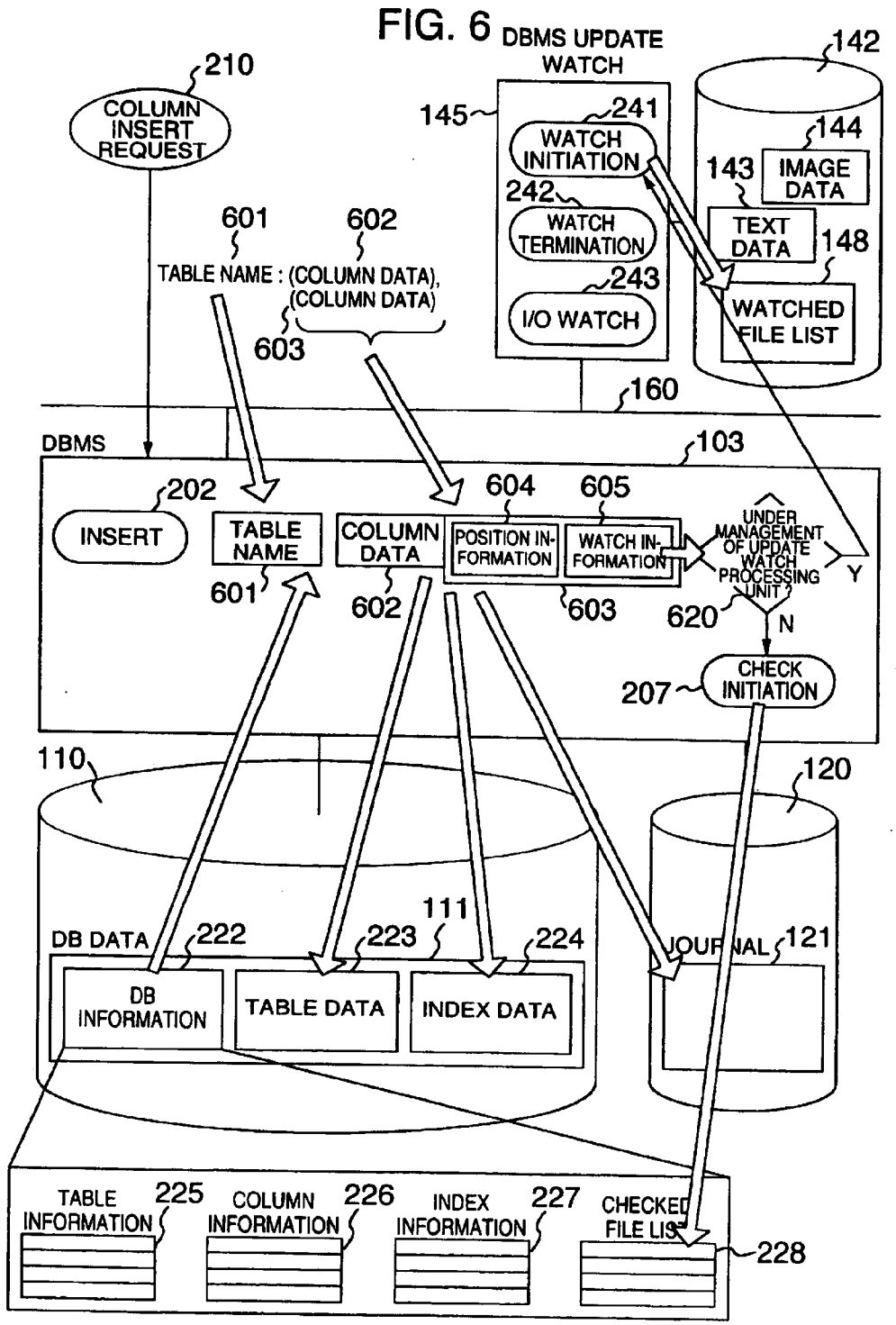
FIG. 6 illustrates an outline of data insert processing in the embodiment of FIG. 1.
Figure 7:
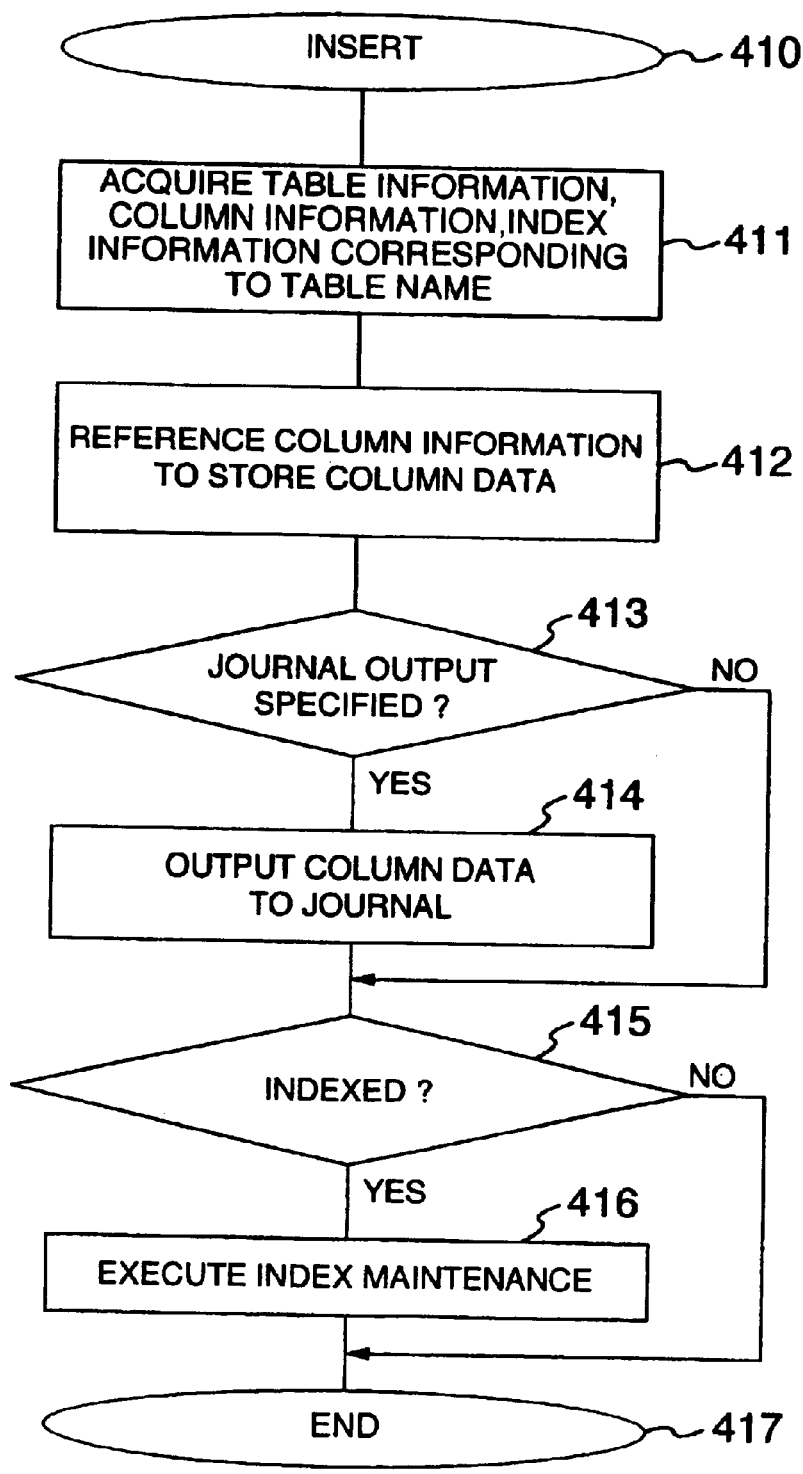
FIG. 7 is a flow chart illustrating a processing procedure for the data insert processing in the embodiment of FIG. 6.

FIG. 6 illustrates an outline of data insert processing according to this embodiment. FIG. 7 is a flow chart illustrating a processing procedure for the data insert processing according to this embodiment. In the following, the data insert processing will be described with reference to FIGS. 6 and 7.

In FIG. 6, a processing request 210 is sent to the DBMS 103 for specifying a table name 601 of a table into which data is inserted; column data 602, 603 to be inserted into respective columns; and so on. Data types set for data to be inserted include integer type, text type, external data reference type, and so on. To the column data 602, 603, data corresponding to their respective types are allocated.

Referring now to FIG. 7, the processing request acceptance processing unit 200 of the DBMS 103 analyzes the processing request 210 accepted from the DB client 130, and runs the insert processing unit 202 to acquire table information 225, column information 226 and index information 227 corresponding to the table name 601 from the DB information 222 (step 411), references the column information 226, and stores the column data 602, 603 in corresponding table data 223 in the DB data 111 (step 412).

If a journal output is specified (step 413), the stored column data 602, 603 are outputted to the journal file 121 (step 414). If an inserted column is indexed (step 415), index maintenance is executed (step 416).

Figure 8:
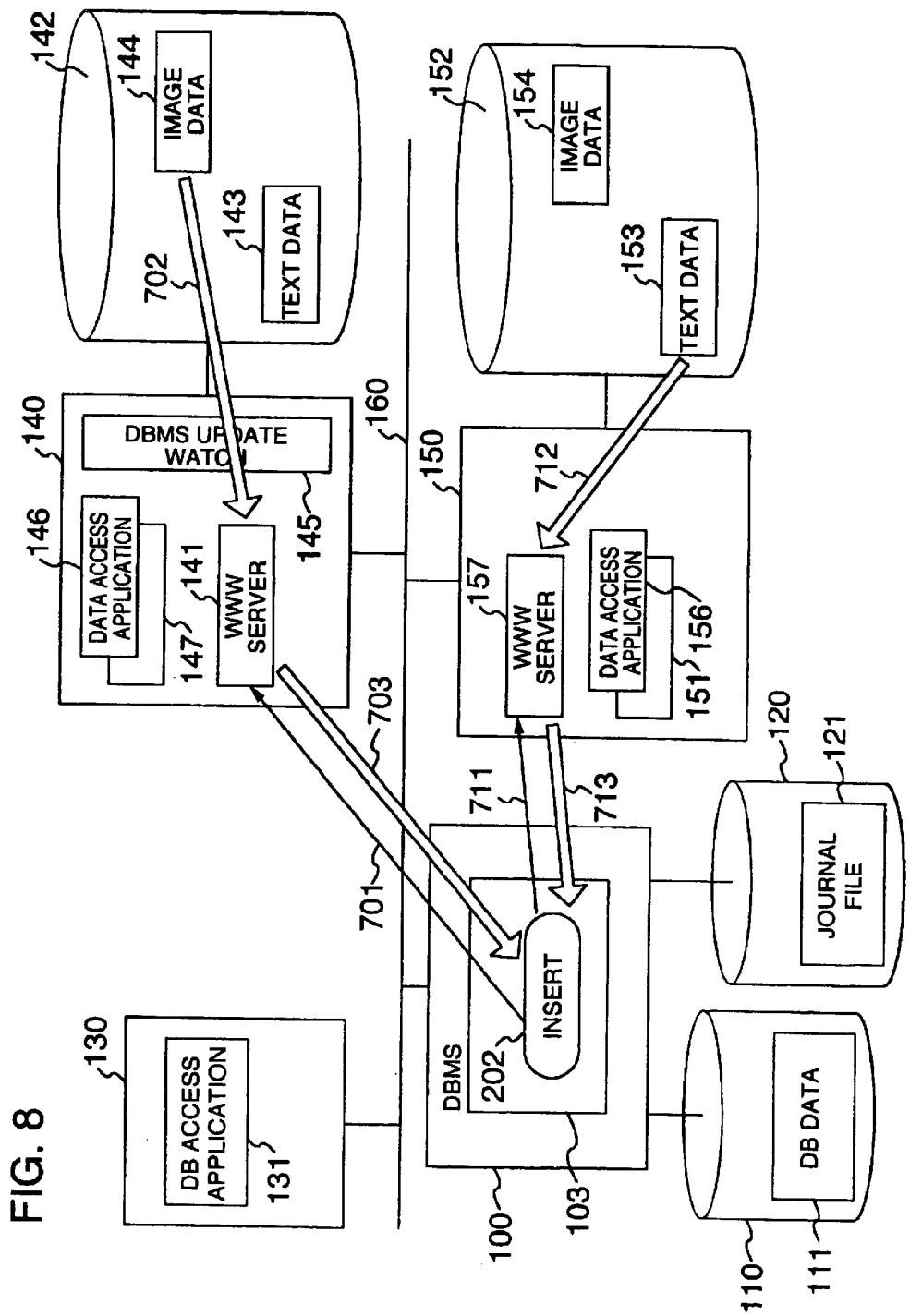
FIG. 8 illustrates an outline of external file reference type data insert processing in the embodiment of FIG. 1.
Figure 9:
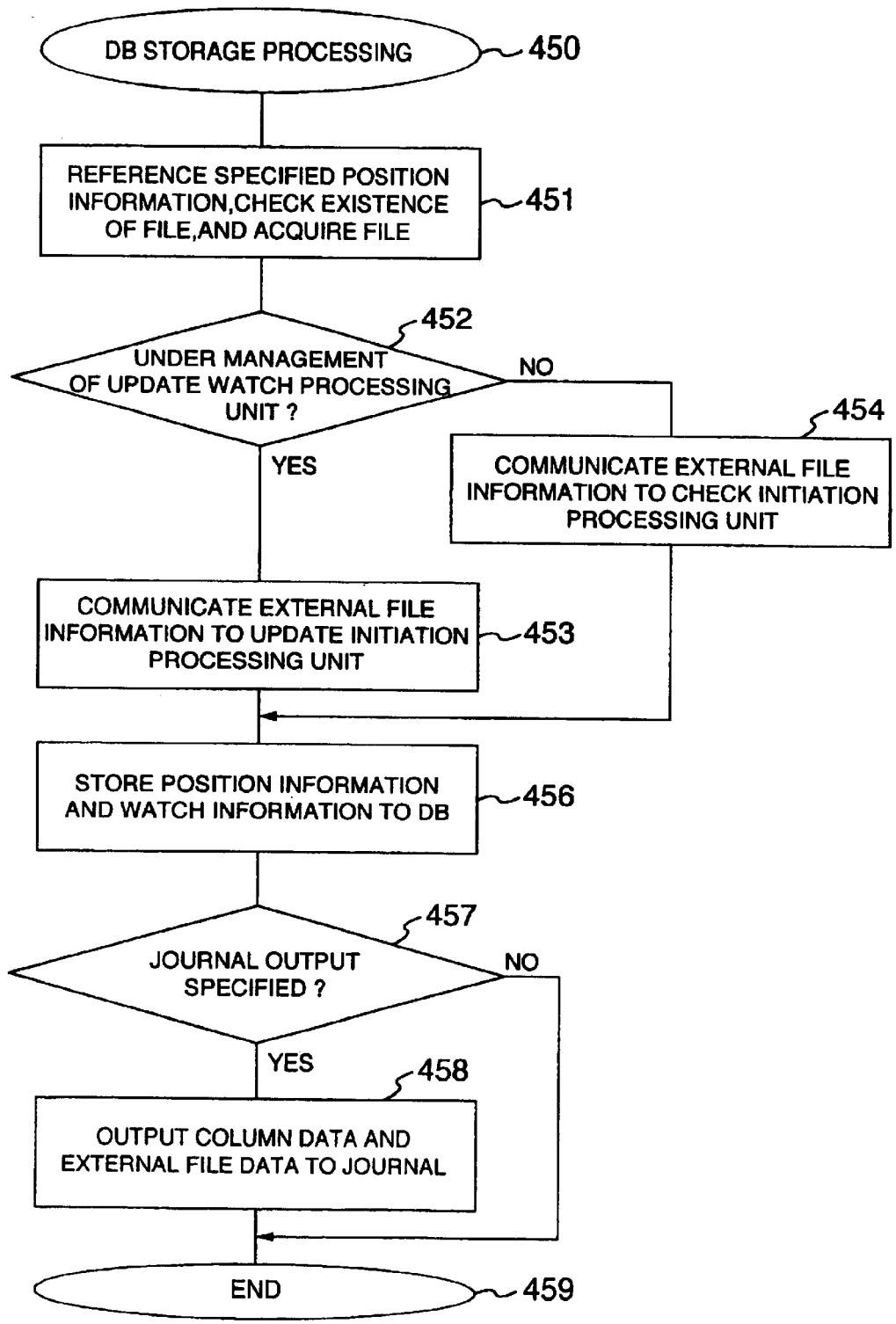
FIG. 9 is a flow chart illustrating a processing procedure for the external file reference type data insert processing in the embodiment of FIG. 8.

FIG. 8 illustrates an outline of external file reference type data insert processing according to this embodiment. FIG. 9 is a flow chart illustrating a processing procedure for the external file reference type data insert processing according to this embodiment. In the following, an insert of external file reference type data will be described with reference to FIGS. 8 and 9.

The DB client 130 specifies position information 604 and watch information 605 as column data 603 when external file reference type data is inserted.

The position information 604 specifies a storage location of an external file to be referenced. This information may be specified using URL for specifying the text data 143, 153 and image data 144, 154 in the file servers 140, 150 which are connected to the DB client 130 through the network 160.

The watch information 605 specifies the frequency of watching the external file, and a watch processing unit responsible for a watch. For example, since data recorded on a CD-ROM or the like is not updated, the watch information 605 specifies READ ONLY as the watching frequency for any file on a CD-ROM. If the external file can be updated, the watch information 605 specifies the watching frequency in hours, days, weeks, months, years, or the like. In addition, when the DBMS update watch processing unit 145 is processing at a storage location at which an external file is stored, the watch information 605 indicates that the external file is a file under-management of the DBMS update watch processing unit 145 as information indicative of a watch processing unit responsible for a watch.

The processing request acceptance processing unit 200 of the DBMS 103 analyzes the processing request 210 accepted from the DB client 130, and runs the insert processing unit 202 of the DBMS 103, forcing the insert processing unit 202 to reference an external file indicated by the position information 604 to check the existence of the external file (step 451 in FIG. 9). When image data 144 in FIG. 8 is specified as an external file, a data transfer request is issued from the DBMS 103 based on the position information 604 to the WWW server 141 (arrow 701 in FIG. 8), forcing the WWW server 141 to transfer the image data 144 (arrows 702, 703). When text data 153 in FIG. 8 is specified in the position information 604, a data transfer request is issued to the WWW server 157 (arrow 711), forcing the WWW server 157 to transfer the text data 153 (arrows 712, 713).

Next, at step 452, the watch information 605 is referenced to check whether the external file is a file currently under management of the DBMS update watch processing unit 145. When the watch information 605 indicates that the external file is a file currently under management of the DBMS update watch processing unit 145, the watch request processing unit 211 is run to issue an external file watch request to the watch initiation processing unit 241 of DBMS update watch processing unit 145, with information on the external file communicated to the watch initiation processing unit 241 (step 453).

Figure 10:
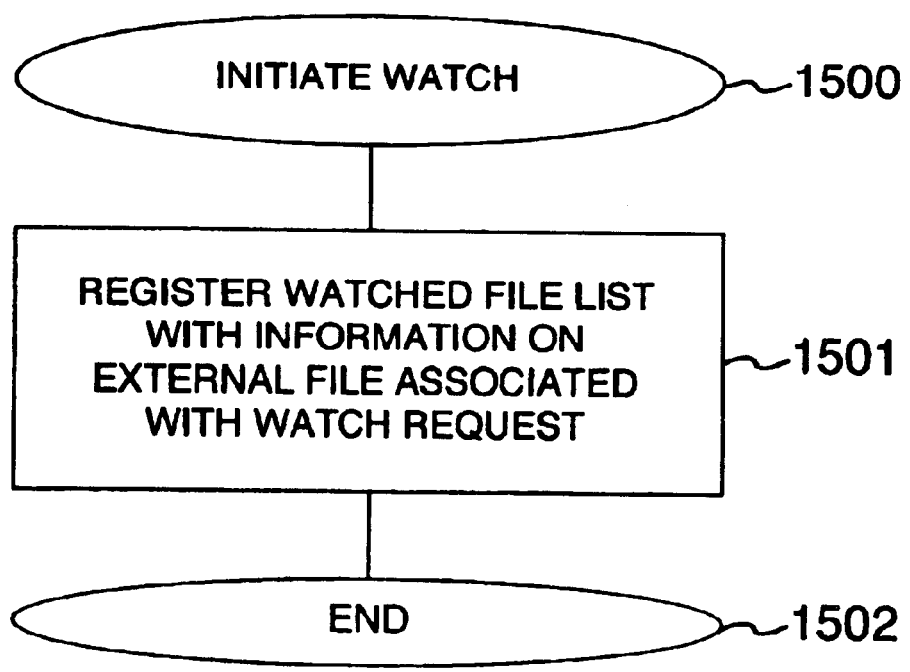
FIG. 10 is a flow chart illustrating a processing procedure for watch initiation processing in the embodiment of FIG. 1.

FIG. 10 is a flow chart illustrating a processing procedure for the watch initiation processing according to this embodiment. As can be seen in FIG. 10, the watch initiation processing unit 241 receives a watch request for requesting the same to watch an external file, and registers the watched file list 148 with information on the external file associated with the received watch request (step 1501).

As a result of referencing the watch information 605 at step 452 in FIG. 9, when the external file is not a file under management of the DBMS update watch processing unit 145, the watch request processing unit 211 issues a request for a check on the external file to the check initiation processing unit 207, with the information on the external file communicated to the check initiation processing unit 207 (step 454).

Figure 11:
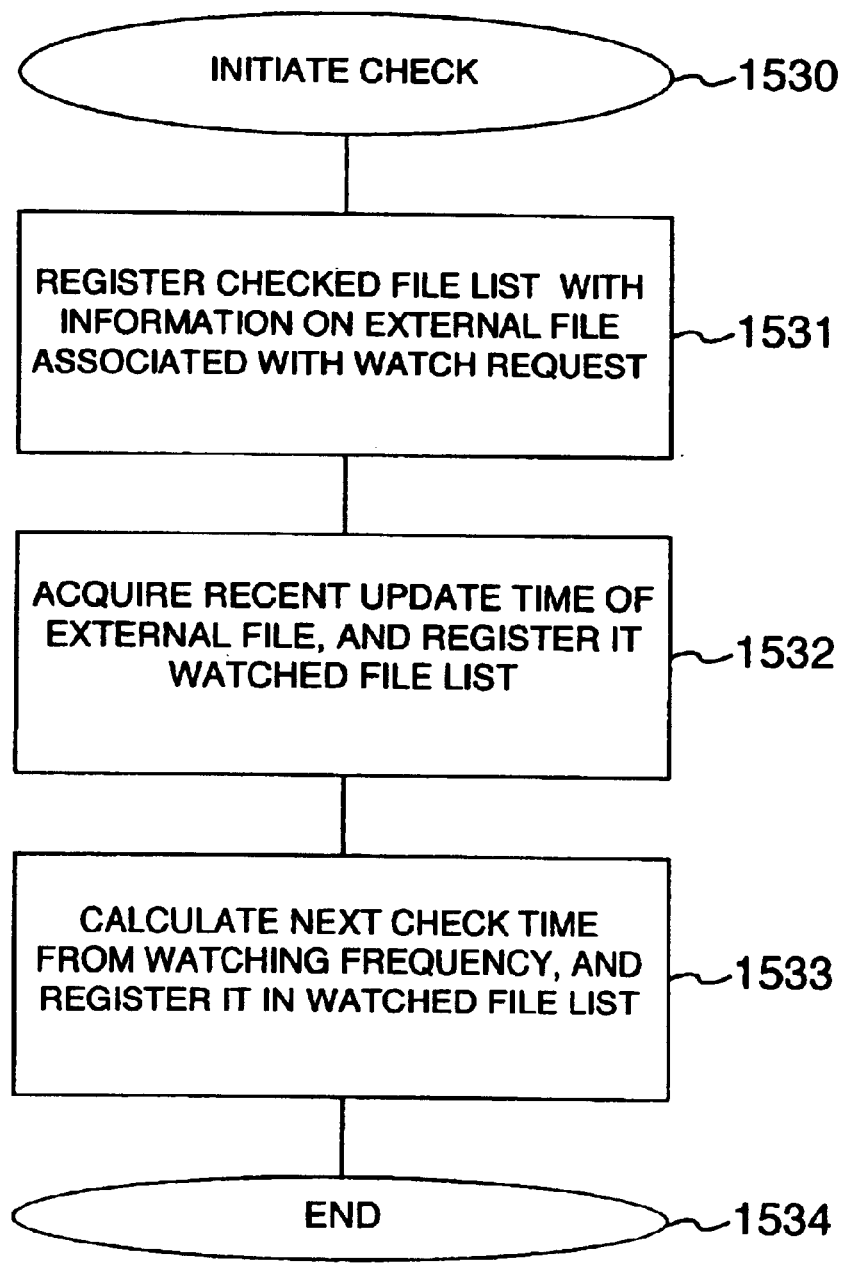
FIG. 11 is a flow chart illustrating a processing procedure for check initiation processing in the embodiment of FIG. 1.

FIG. 11 is a flow chart illustrating a processing procedure for the check initiation processing according to this embodiment. As can be seen in FIG. 11, the check initiation processing unit 207 registers the checked file list 228 with the information on the external file associated with the issued check request (step 1531), acquires the external file and registers the checked file list 228 with a recent update time of the external file (step 1532), and calculates the next check time from the watch frequency in the watch information 605 and registers the checked file list 228 with the calculated next check time (step 1533).

At step 456 in FIG. 9, the position information 604 and the watch information 605 of the column data 603 are stored in the DB. Next, it is checked whether or not a journal output is specified (step 457). If so specified, the column data 603 and the acquired external file are both outputted to the journal file 121 (step 458).

Figure 12:
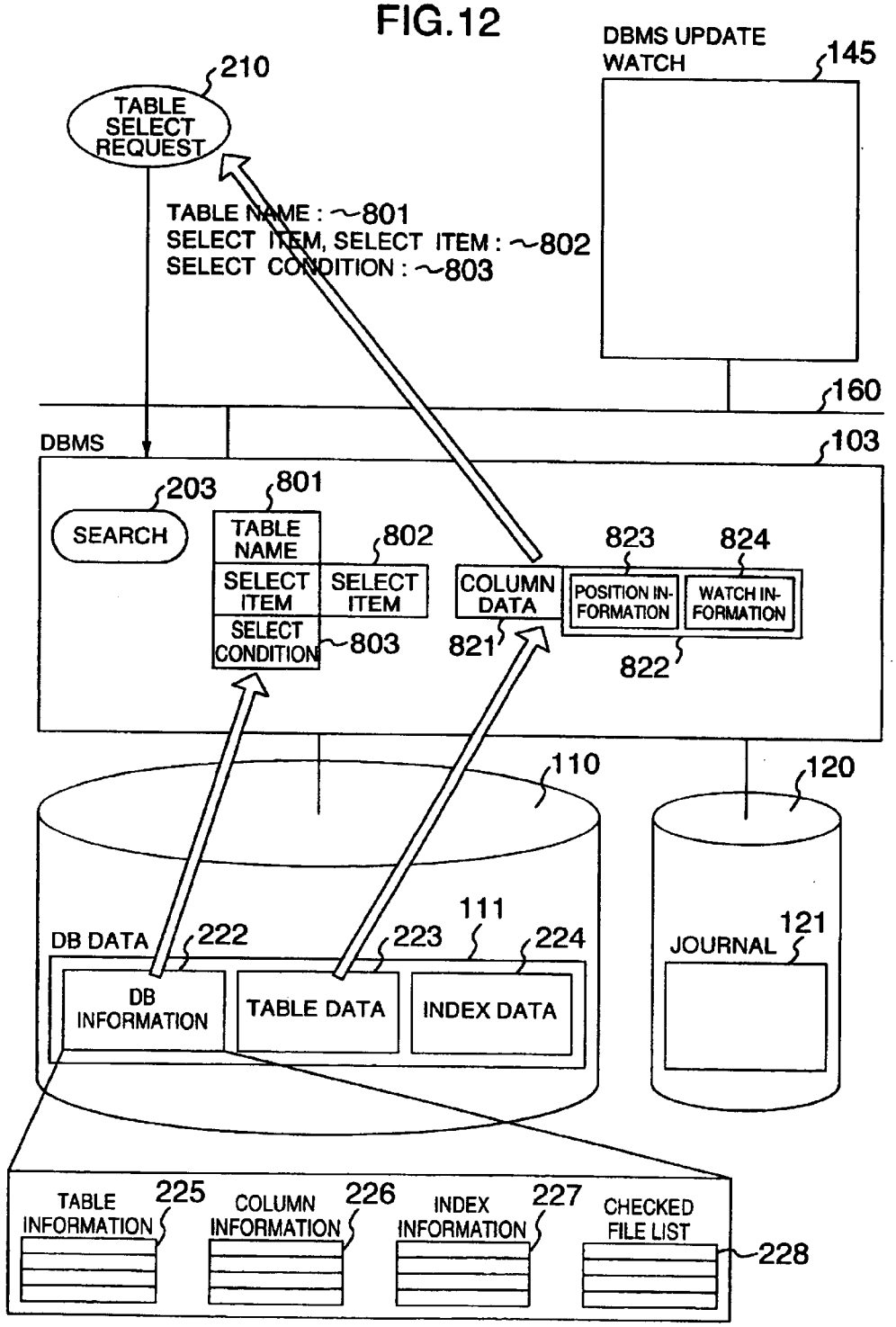
FIG. 12 illustrates an outline of data select processing in the embodiment of FIG. 1.
Figure 13:
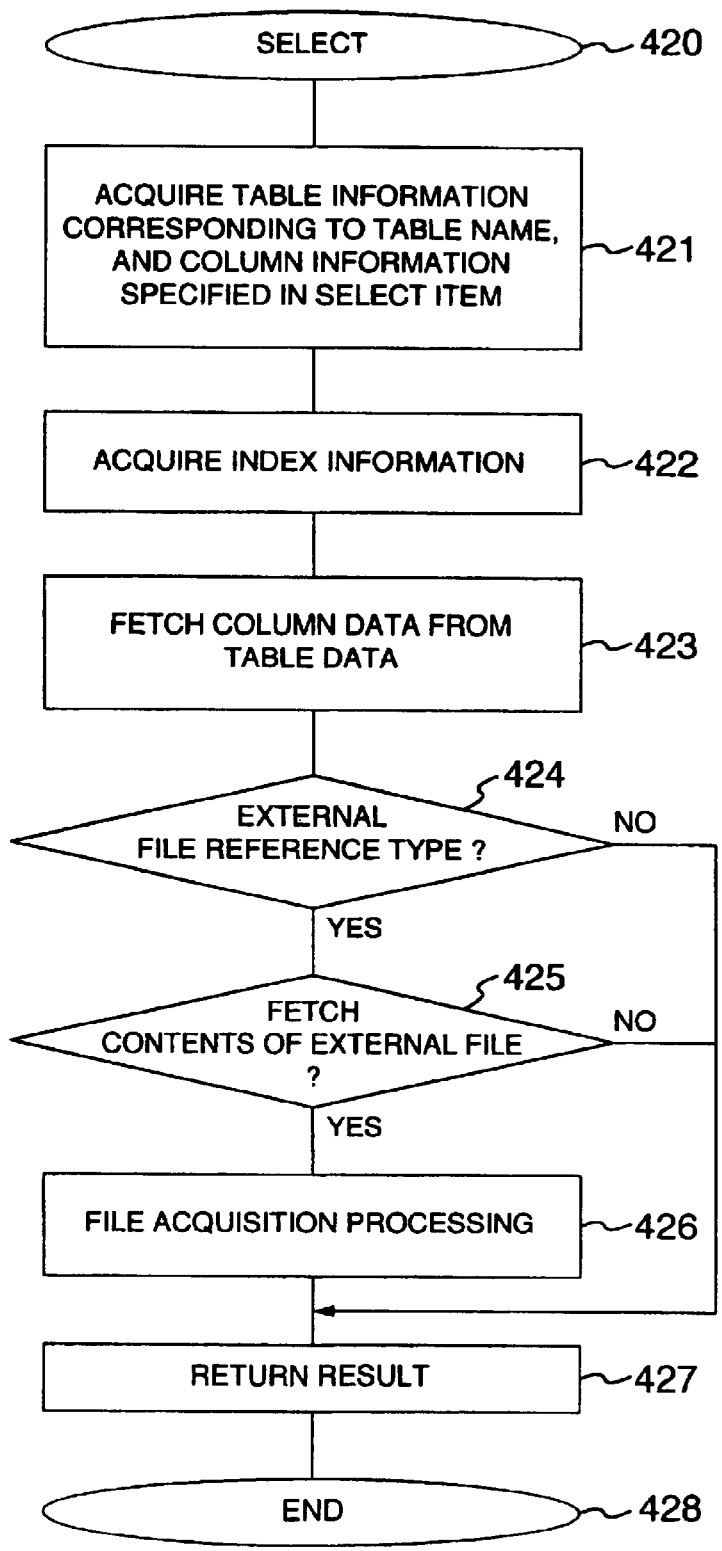
FIG. 13 is a flow chart illustrating a processing procedure for the data select processing in the embodiment of FIG. 12.

FIG. 12 illustrates an outline of data select processing according to this embodiment. FIG. 13 is a flow chart illustrating a processing procedure for the data select processing according to this embodiment. In the following, the data select processing will be described with reference to FIGS. 12 and 13.

In FIG. 12, a processing request 210 is sent to the DBMS 103 for specifying a table name 801 of a table to be retrieved, a select item 802 and a select condition 803. The select item 802 specifies the name of a column to be retrieved, and an operation performed on the column. When the column is specified as the external file reference type, the processing request 210 can specify a processing type indicating which of column data and the contents of an external file are to be processed.

Referring now to FIG. 13, the processing request acceptance processing unit 200 of the DBMS 103 analyzes the processing request 210 accepted from the DB client 130, runs the select processing unit 203, forcing the select processing unit 203 to acquire table information 225 corresponding to the table name 801, and column information 226 specified in the select item 802 from the DB information 222 (step 421), and acquires index information 227 associated with the select condition 803 from the DB information 222 (step 422).

Then, the select processing unit 203 fetches data of a column specified in the select item 802 for a row which meets the select condition 803 from table data 223 (step 423). In this event, when the index information 227 available for the select condition has been acquired at step 422, the index data 224 is used to evaluate the condition. Conversely, if no index information 227 has been acquired at step 422, the table data 223 is sequentially referenced to evaluate the condition.

The data type of the select item is checked (step 424), and if the column data type is other than the external file reference type, the fetched column data 821 is transmitted to the DB client 130 (step 427).

If the column data type is the external file reference type, the processing type is referenced to check which of the column data and the contents of the external file are to be processed (step 425). If the column data is to be processed, positional information 823 and watch information 824 fetched from the DB data 111 are transmitted to the DB client 130 (step 427). On the other hand, if the contents of the external file are to be processed, external file data is acquired based on the position information 823 fetched from the DB data 111 (step 426), and the acquired data is transmitted to the DB client 130 (step 427).

The acquisition of external file data is similar to a check on the existence of a file in the insert processing. Specifically, as illustrated in FIG. 8, a transfer request is issued to the WWW server 141 or 157 corresponding to the position information 823, causing WWW server 141 or 157 to transfer the requested data.

Figure 14:
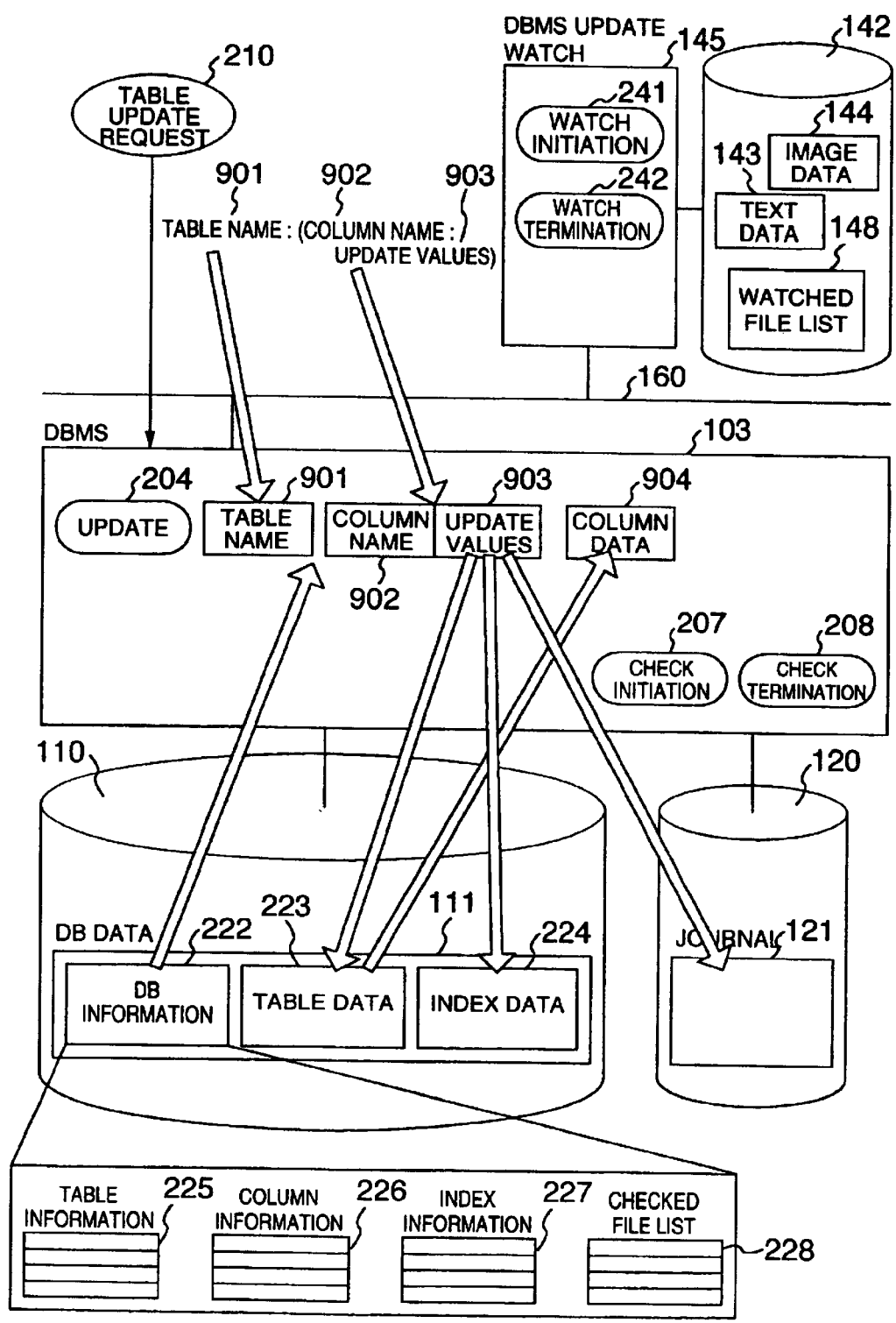
FIG. 14 illustrates an outline of column data update processing in the embodiment of FIG. 1.
Figure 15:
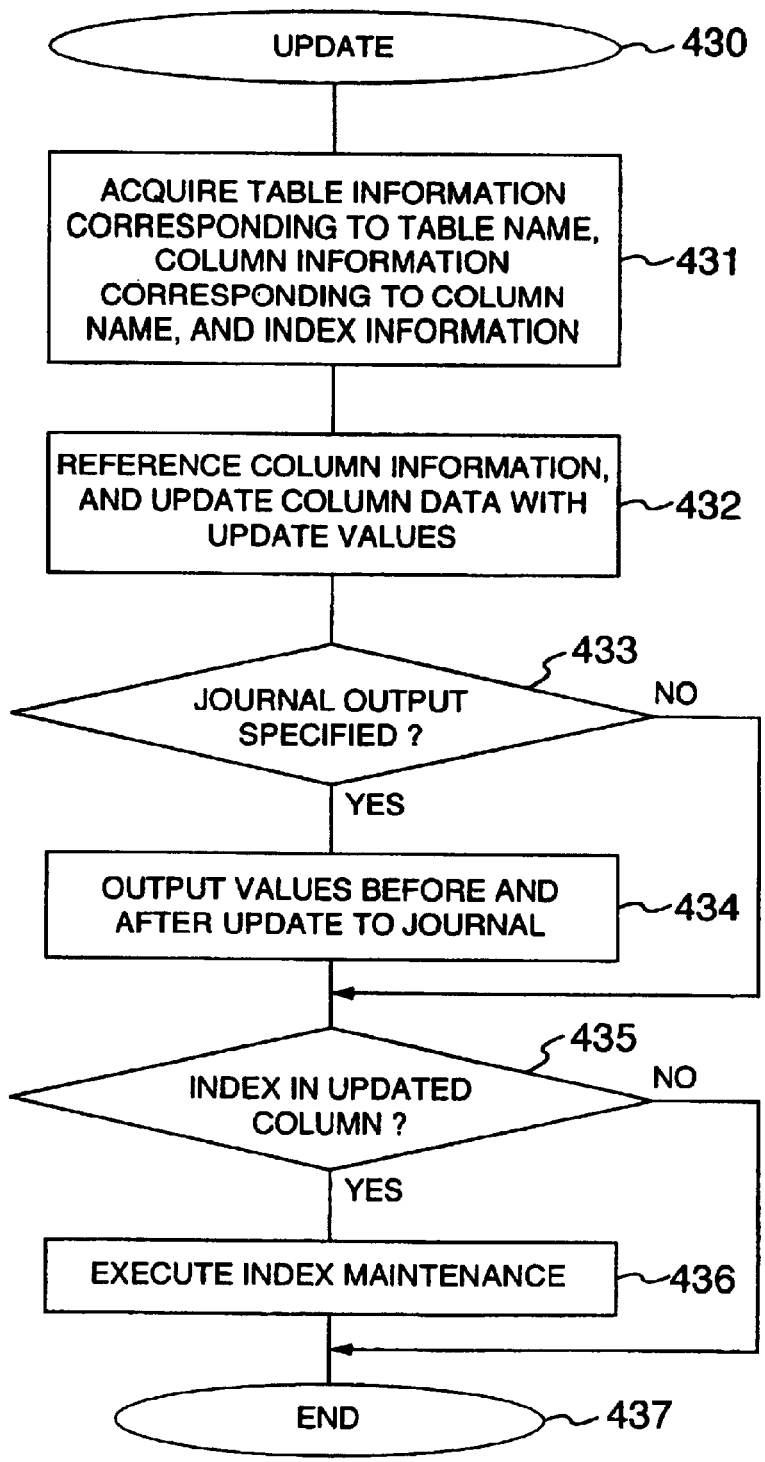
FIG. 15 is a flow chart illustrating a processing procedure for the column data update processing in the embodiment of FIG. 14.

FIG. 14 illustrates an outline of column data update processing according to this embodiment. FIG. 15 is a flow chart illustrating a processing procedure for the column data update processing according to this embodiment. In the following, the data update processing will be described with reference to FIGS. 14 and 15. A processing request 210 is sent to the DBMS 103 for specifying a table name 901 of a table to be updated, a column name 902 of a column to be updated, update values 903 therefor, and so on.

The processing request acceptance processing unit 200 of the DBMS 103 analyzes the processing request 210 accepted from the DB client 130, and runs the update processing unit 204, forcing the update processing unit 204 to acquire table information 225 corresponding to the table name 901, column information 226 corresponding to the column name 902 of the column which is specified to be updated, and index information 227 from the DB information 222 (step 431).

Next, the update processing unit 204 references the column information 226 and the index information 227 to fetch column data 904 from the table data 223, and updates a column value in the table data 223 with the update values 903 (step 432). At step 433, it is checked whether or not a journal output is specified. If so specified, the column value before the update and the column value after the update are both outputted to the journal file 121 (step 434). At step 435, it is checked whether or not the updated column is indexed. If indexed, the index maintenance processing unit 213 executes maintenance of the index data 224 (step 436).

Figure 16:
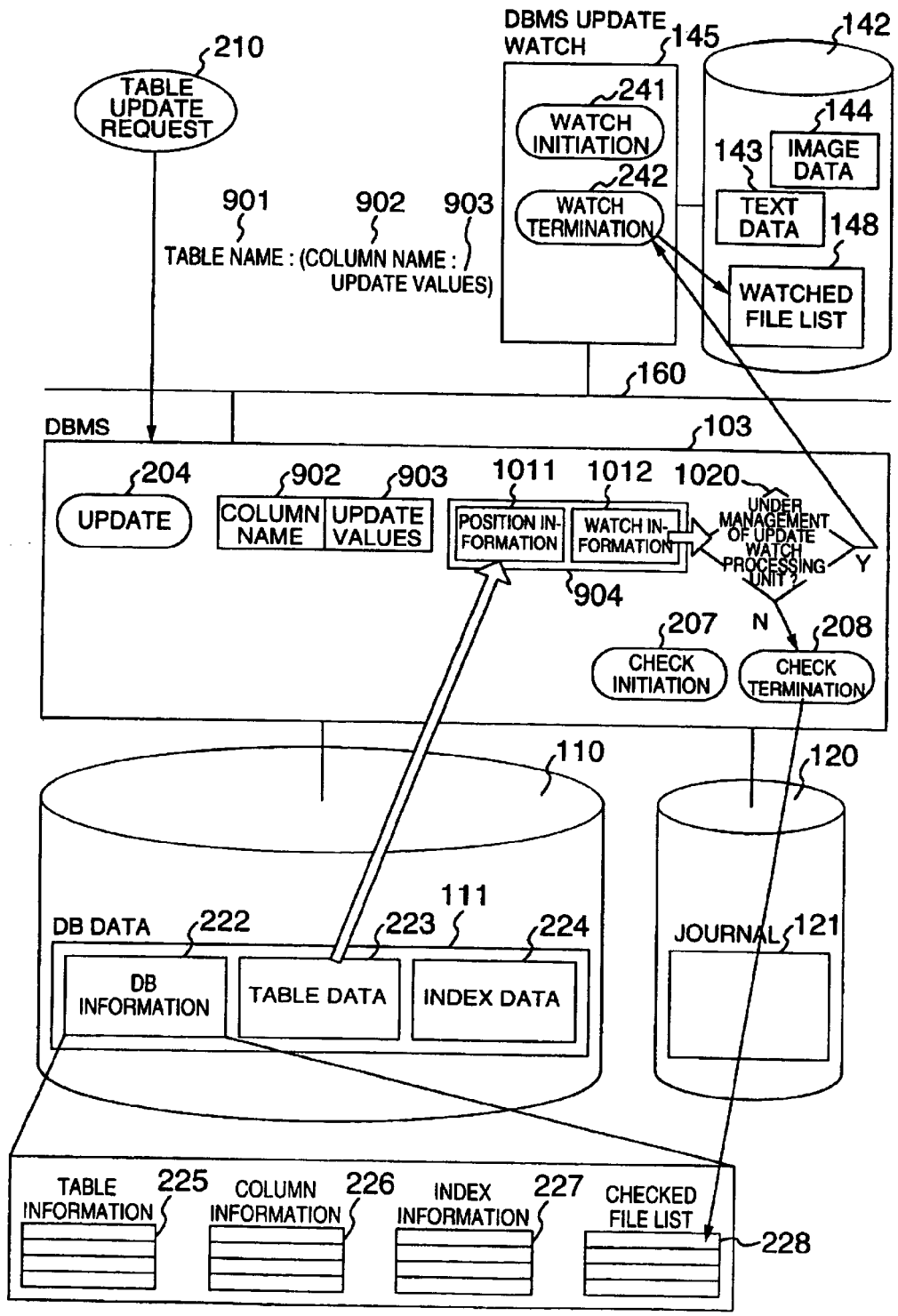
FIG. 16 illustrates an outline of how watch processing is terminated during external file change processing in the embodiment of FIG. 1.

FIG. 16 illustrates an outline of how watch processing is terminated in external file change processing according to this embodiment. More specifically, FIG. 16 represents the processing for terminating the update watch processing or the update check processing when column data to be updated is updated or a external file to be referenced is changed.

Figure 17:
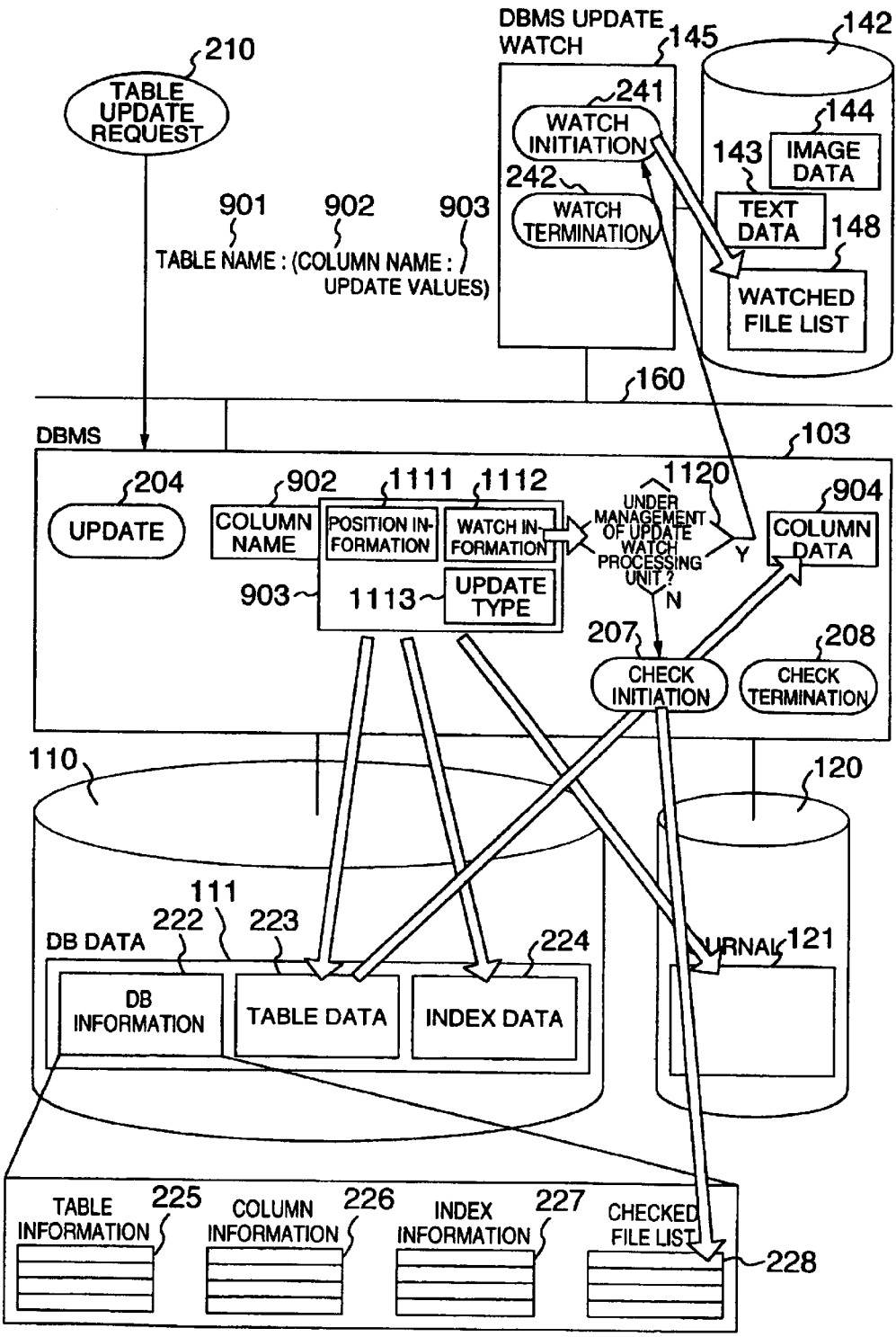
FIG. 17 illustrates an outline of how the watch processing is initiated during the external file change processing in the embodiment of FIG. 1.

FIG. 17 illustrates an outline of how the watch processing is initiated in the external file update processing according to this embodiment. With the external file reference type, position information 1111, watch information 1112 and update type 1113 are specified as update values 903, as can be seen in FIG. 17. The values for the position information 1111 and the watch information 1112 are the same as those specified in the data insert processing. The update type 1113 indicates which of column data and the contents of an external file are to be processed.

When position information 1011 of column data to be updated is updated to change an external file to be referenced, the update watch processing or the update check processing on an external file indicated by the position information 1011 of the column data 904 in FIG. 16 is terminated, and column values in the table data 223 are updated with the update values 903, followed by initiating the update watch processing or the update check processing on an external file indicated by the position information 1111 included in the update values 903.

Figure 18:
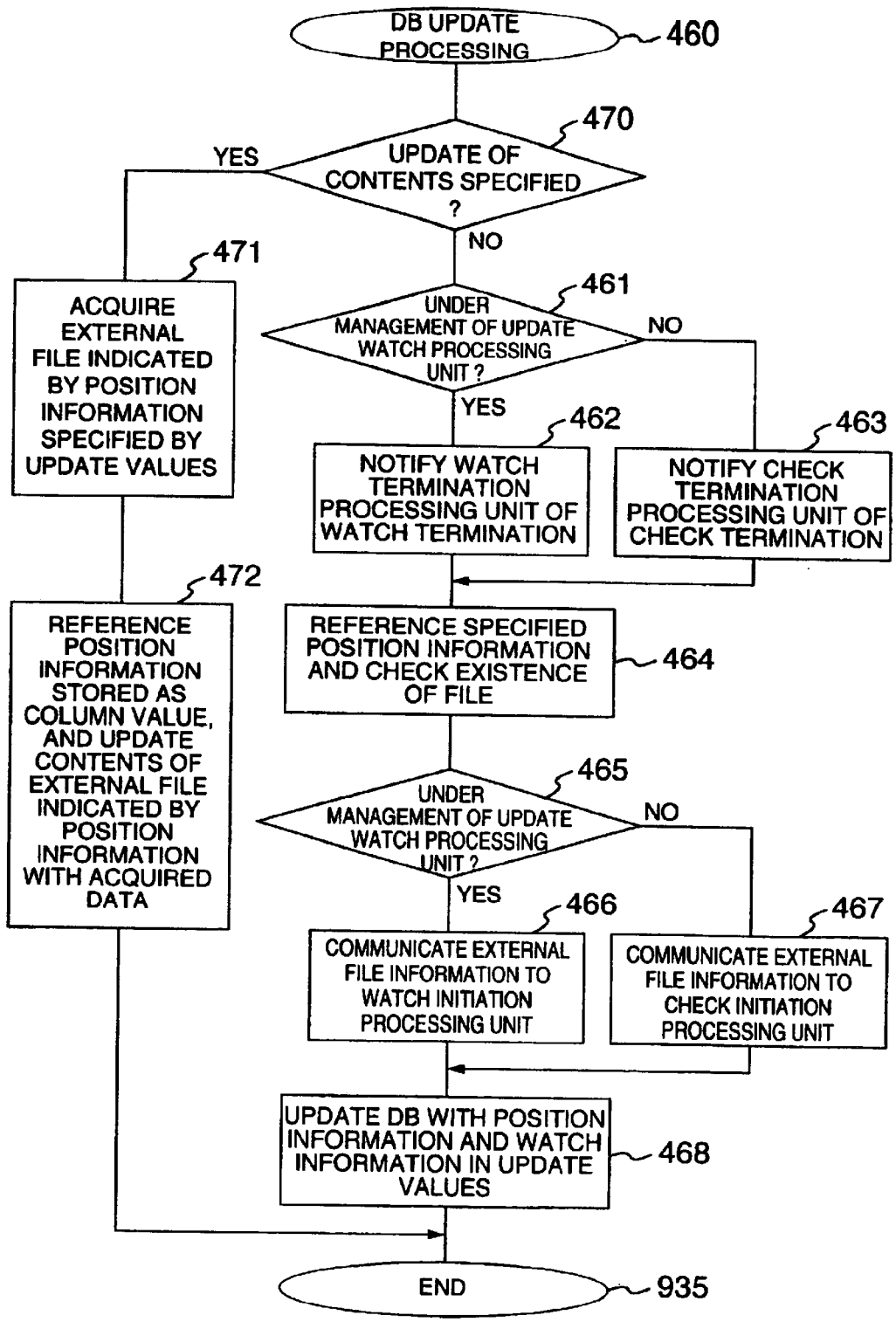
FIG. 18 is a flow chart illustrating a processing procedure for external data reference type column data update processing in the embodiment of FIG. 1.

FIG. 18 is a flow chart illustrating a processing procedure for the external data reference type column data update processing according to this embodiment. The processing involved in changing an external file to be referenced will be described in detail with reference to FIGS. 16 to 18.

The processing request acceptance processing unit 200 of the DBMS 103 analyzes a processing request 210 accepted from the DB client 130, and runs the update processing unit 204, causing the update processing unit 204 to reference an update type 1113 to examine whether or not the processing request 210 is intended to update the contents of an external file indicated by the position information 1011 (step 470).

When the processing request 210 is not intended to update the contents of the external file but to update the position information 1011 to change an external file to be referenced, the procedure proceeds to step 461, where the update processing unit 204 references watch information 1012 of the column data 904 to be updated, which has been fetched from the table data 223, to check whether or not the external file indicated by the position information 1011 is a file currently under management of the DBMS update watch processing unit 145 (step 461). If the external file is a file currently under management of the DBMS update watch processing unit 145, the watch termination notification processing unit 212 is run to notify the DBMS update watch processing unit 145 that the watch is terminated (step 462).

FIG. 19 is a flow chart illustrating a processing procedure for the watch termination processing according to this embodiment. As can be seen in FIG. 19, the DBMS update watch processing unit 145, upon receipt of a watch termination notice, runs the watch termination processing unit 242 to delete from the watched file list 148 information on an external file associated with the notified watch termination (step 1511).

Conversely, when the external file is not a file under management of the DBMS update watch processing unit 145, the check termination processing unit 208 is run through the watch termination notification processing unit 212 (step 463).

FIG. 20 is a flow chart illustrating a processing procedure for the check termination processing according to this embodiment. As can be seen in FIG. 20, the check termination processing unit 208 deletes from the checked file list 228 information on an external file associated with the notified check termination (step 1541).

Subsequently, the processing similar to the data insert processing is executed to reference the specified position information 1111, to check the existence of an external file indicated by the position information 1111, and to acquire the external file if it exists (step 464). The acquisition of external file data is similar to a check which is made to see whether or not a file exists during the insert processing. Specifically, as previously shown in FIG. 8, a transfer request is issued to a WWW server 141 or 157 corresponding to the position information 111, causing the associated WWW server 141 or 157 to transfer the data concerned.

Next, the watch information 1112 is referenced to check whether or not the external file indicated by the position information 1111 is a file currently under management of the DBMS update watch processing unit 145 (step 465). When the external file is a file currently under management of the DBMS update watch processing unit 145, the watch request processing unit 211 is run to communicate information on the external file to the watch initiation processing unit 241 of the DBMS update watch processing unit 145, and to request the watch initiation processing unit 241 to watch the external file (step 466). The watch initiation processing unit 241 registers the watched file list 148 with the information on the external file associated with the issued watch request, as previously shown in FIG. 10 (step 1501).

Conversely, when the external file is not a file currently under management of the DBMS update watch processing unit 145, the watch request processing unit 211 is run to communicate the information on the external file to the check initiation processing unit 207 and to request the check initiation processing unit 207 to check the external file (step 467 in FIG. 18). As previously shown in FIG. 11, the check initiation processing unit 207 registers the checked file list 228 with the information on the external file associated with the issued check request (step 1531), acquires a recent update time of the external file to register the acquired recent update time in the checked file list 228 (step 1532), and calculates the next check time from the watch frequency in the watch information 1112 to register the calculated next check time in the checked file list 228 (step 1533).

On the other hand, when the contents of an external file referenced by column data is to be updated, the update processing unit 204 acquires an external file indicated by the position information 1111 in the update values 903 in FIG. 17, and changes the external file indicated by the position information 1011 in the column data 904 in FIG. 16 with the value of the acquired external file.

Next, the processing involved in updating the contents of a referenced external file will be described in detail with reference to FIGS. 16 to 18. As the result of the examination at step 470 in FIG. 18, which has been made with reference to the update type 1113 to see whether the processing request 210 is intended to update the contents of an external file indicated by the position information 1011, when the processing request 210 is exactly intended to update the contents of an external file, the contents of the external file indicated by the position information 1011 is acquired, and stored in the journal file 121. Then, a check is made on the existence of an external file indicated by the position information 1111 specified in the update values 903, and the contents of the external file are acquired if it exists (step 471).

The acquisition of external file data is similar to a check on the existence of a file in the insert processing. Specifically, as previously shown in FIG. 8, a transfer request is issued to a WWW server 141 or 157 corresponding to the position information 1111, causing the associated WWW server 141 or 157 to transfer the data concerned. Then, the acquired data is stored in the external file indicated by the position information 1011 in the column data 904 (step 472). As described above, if a journal of an external file to be updated has been acquired prior to an update, the external file may be returned to the value before the update by referencing the journal.

Figure 21:
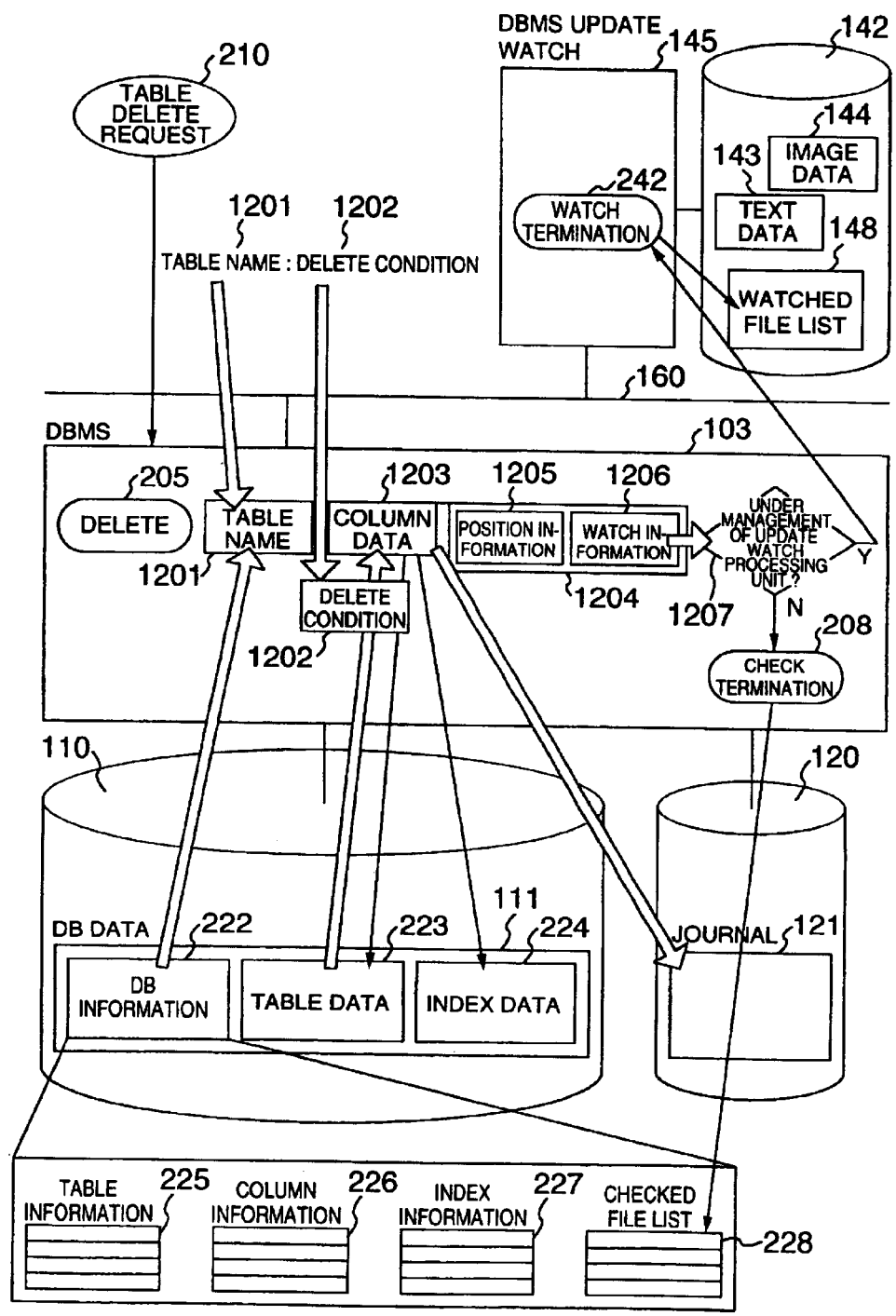
FIG. 21 illustrates an outline of data delete processing in the embodiment of FIG. 1.
Figure 22:
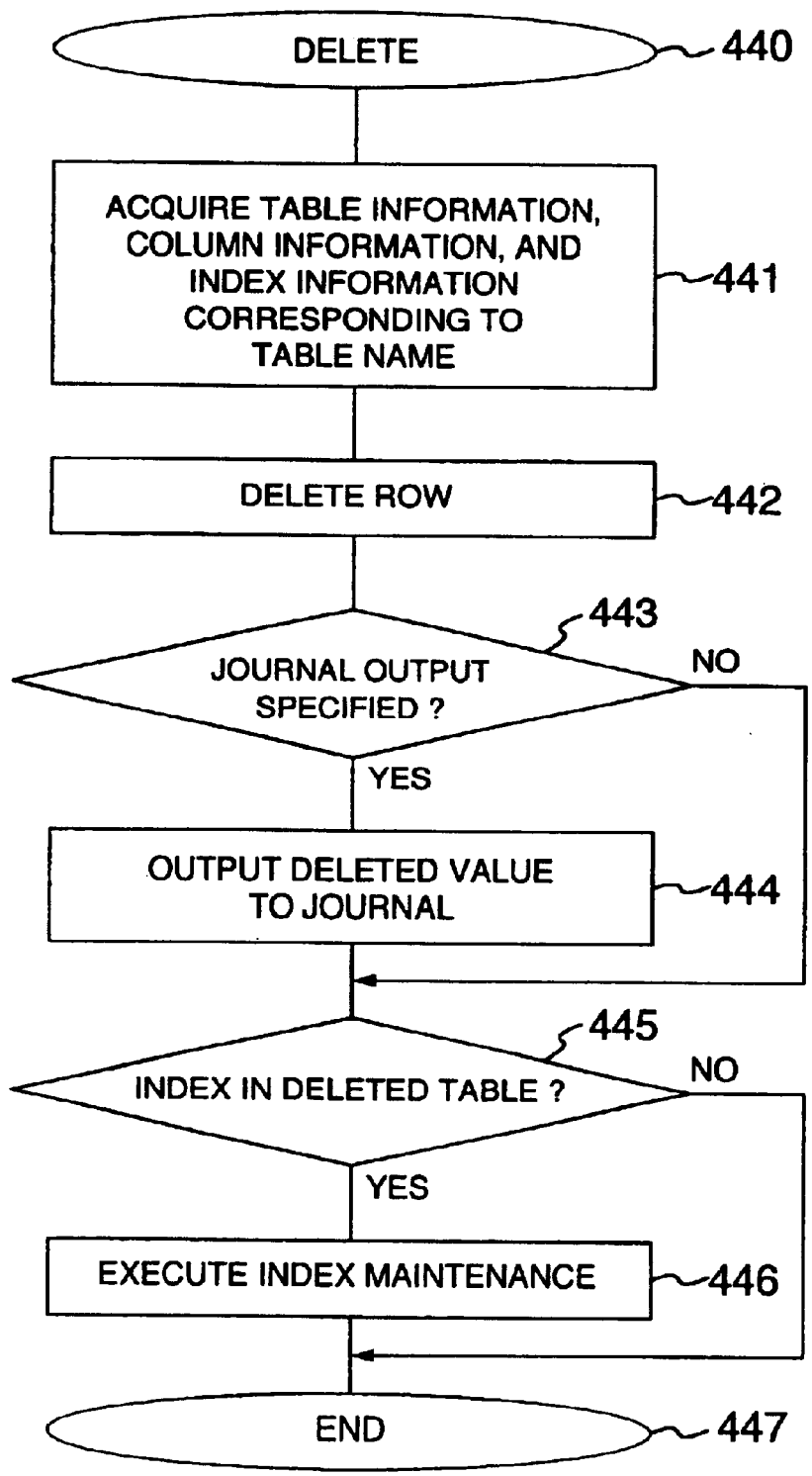
FIG. 22 is a flow chart illustrating a processing procedure for the data delete processing in the embodiment of FIG. 21.

FIG. 21 illustrates an outline of data delete processing according to this embodiment. FIG. 22 is a flow chart illustrating a processing procedure for the data delete processing according to this embodiment. The data delete processing will next be described with reference to FIGS. 21 and 22.

A processing request 210 is sent to the DBMS 103 for specifying a table name 1201 of a table to be deleted, a delete condition 1202, and so on. When the table to be deleted includes column data of external file reference type, the processing request 210 can specify a processing type to indicate which of column data and the contents of an external file are to be processed.

The processing request acceptance processing unit 200 of the DBMS 103 analyzes the processing request 210 accepted from the DB client 130, runs the delete processing unit 205 to acquire table information 225 corresponding to the table name 1201, column information 226, and index information 227 associated with the table from the DB information 222 (step 441) and to access the table data 223 to delete data which meets the delete condition 1202 (step 442).

At step 443, it is checked whether or not a journal output is specified. If so specified, the value before the delete is outputted to the journal file 121 (step 444). At step 445, it is checked whether or not the deleted table has included any indexed column. If any indexed column is found, the index maintenance processing unit 213 is run to execute maintenance of the index (step 446).

Figure 23:
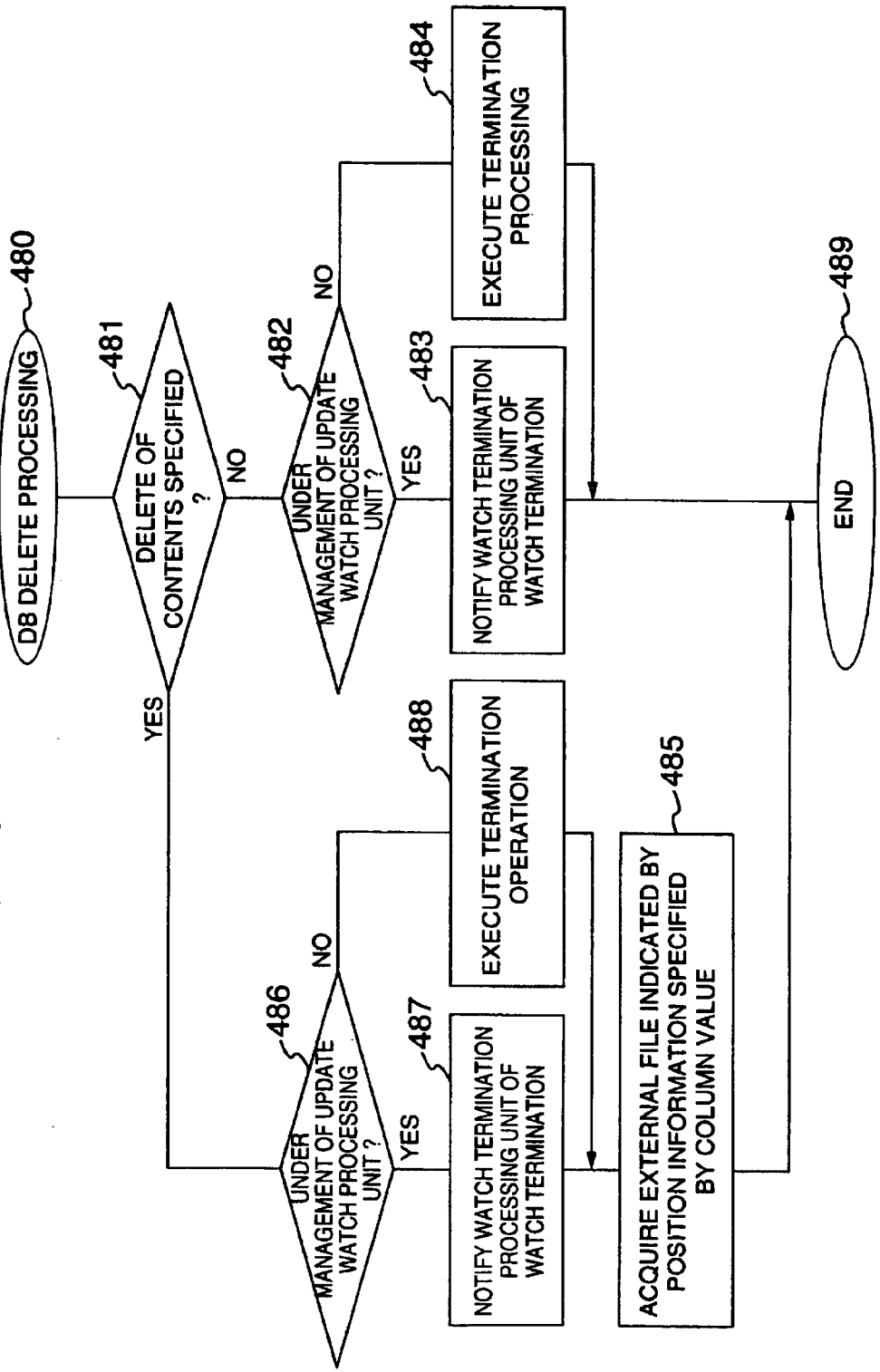
FIG. 23 is a flow chart illustrating a processing procedure for the data delete processing in the embodiment of FIG. 21.

FIG. 23 is a flow chart illustrating a processing procedure for the data delete processing according to this embodiment. When a table includes a column of external file reference type, the processing type is checked as shown in FIG. 23 (step 481). If a delete of stored column data 1203 is specified, watch information 1206 in the column data 1203 is referenced to check whether or not an external file indicated by position information 1205 is a file currently under management of the DBMS update watch processing unit 145 (step 482).

If the external file is a file currently under management of the DBMS update watch processing unit 145, the watch termination notification processing unit 212 is run to notify the DBMS update watch processing unit 145 that the watch is terminated (step 483). As previously shown in FIG. 19, the DBMS update watch processing unit 145, upon receipt of the watch termination notice, runs the watch termination processing unit 242 to delete from the watched file list 148 information on the external file associated with the watch termination notice received by the DBMS update watch processing unit 145 (step 1511).

Conversely, if the external file is not a file currently under management of the DBMS update watch processing unit 145, the check termination processing unit 208 is run through the watch termination notification processing unit 212 (step 484). As previously shown in FIG. 20, the check termination processing unit 208 deletes from the checked file list 228 the information on the external file associated with the watch termination notice received by the DBMS update watch processing unit 145 (step 1541).

On the other hand, if a delete of an external file itself indicated by the positional information 1205 has been specified at step 481, the watch information 1206 in the column data 1203 is referenced to check whether or not the external file is a file currently under management of the DBMS update watch processing unit 145 (step 486).

If the external file is a file currently under management of the DBMS update watch processing unit 145, the watch termination notification processing unit 212 notifies the DBMS update watch processing unit 145 that the watch is terminated (step 487). As previously shown in FIG. 19, the DBMS update watch processing unit 145, upon receipt of the watch termination notice, runs the watch termination processing unit 242 to delete from the watched file list 148 information on the external file associated with the watch termination notice received by the DBMS update watch processing unit 145 (step 1511).

Conversely, if the external file is not a file currently under management of the DBMS update watch processing unit 145, the check termination processing unit 208 is run through the watch termination notification processing unit 212 (step 488). As previously shown in FIG. 20, the check termination processing unit 208 deletes from the checked file list 228 the information on the external file associated with the watch termination notice (step 1541).

At step 485, the position information 1205 in the column data 1203 is referenced to acquire the contents of an external file indicated by the position information 1205. The external file is deleted after it is stored in the journal file 121 (step 485). As described above, when a journal of an external file to be deleted has been acquired prior to a delete, the external file may be returned to the value before the delete by referencing the journal.

Figure 24:
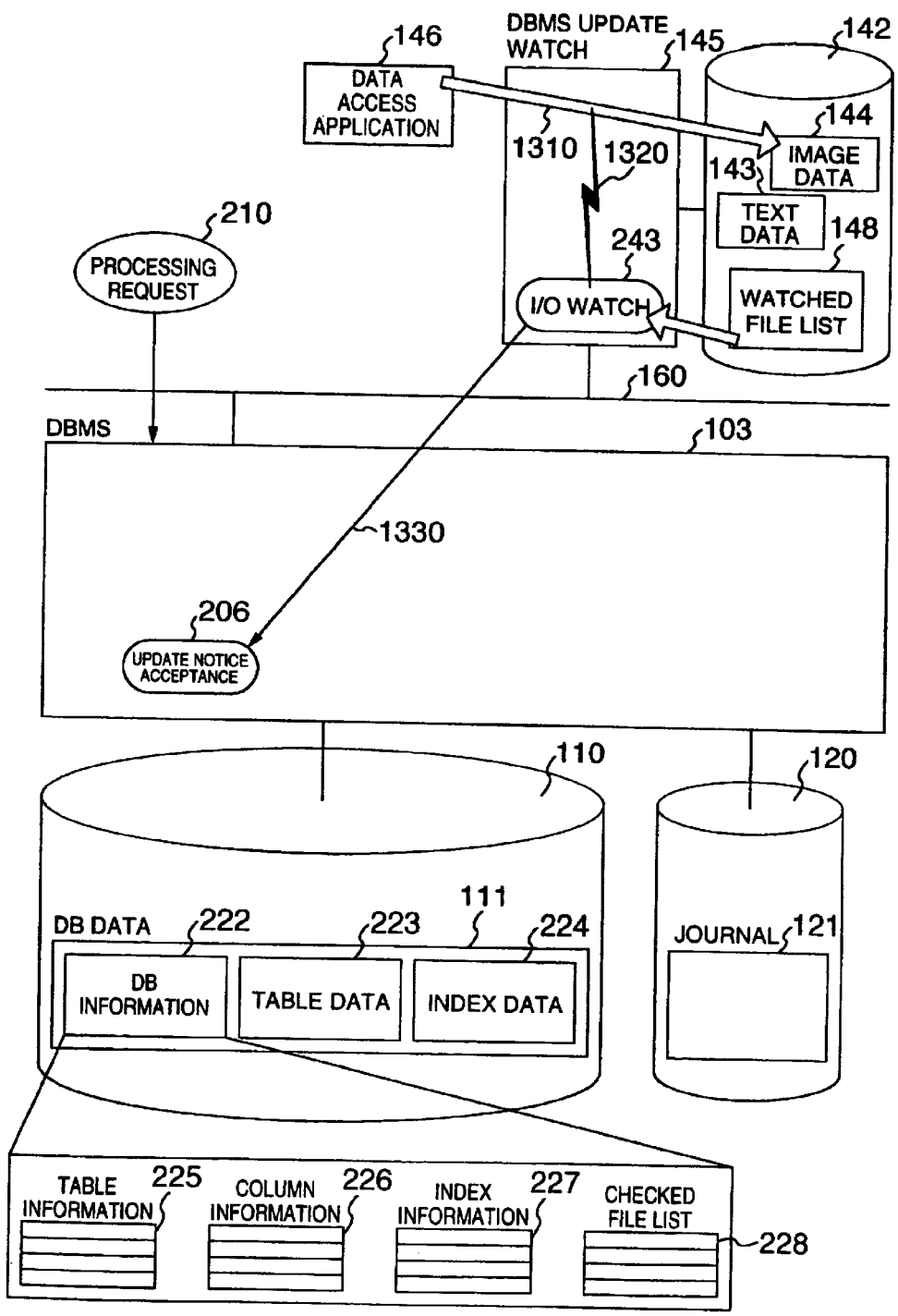
FIG. 24 illustrates an outline of the processing performed by an I/O watch processing unit 243 in the embodiment of FIG. 3.

FIG. 24 illustrates an outline of the processing performed by the I/O watch processing unit 243 according to this embodiment. Update watch processing will next be described with reference to FIG. 24. When an external file is inserted or updated under management of the DBMS update watch processing unit 145 during the insert processing or the update processing to a table including a column of external file reference type, the DBMS 103 requests the DBMS update watch processing unit 145 of a storage location, in which external file reside, to initiate watching the external file. Then, the watched file list 148 is registered with information on the external file subjected to the requested watch.

Figure 25:
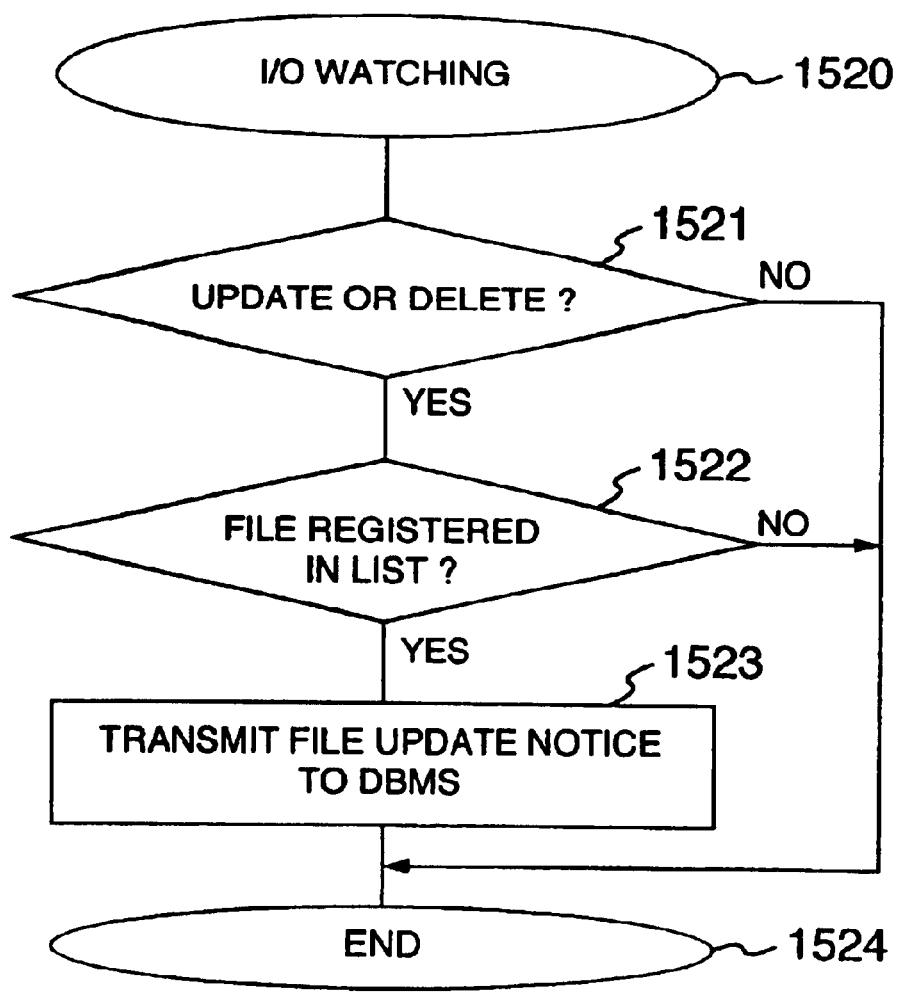
FIG. 25 is a flow chart illustrating a processing procedure for the I/O watch processing in the embodiment of FIG. 24.

FIG. 25 is a flow chart illustrating a processing procedure for the I/O watch processing according to this embodiment. The I/O watch processing unit 243 of the DBMS update watch processing unit 145 watches processing executed on the text data 143 and the image data 144 in the file server 142. When such processing updates or deletes an external file registered in the watched file list 148, the I/O watch processing unit 243 sends to the DBMS 103 an update notice indicating that the external file has been updated or deleted.

The I/O watch processing unit 243 of the DBMS update watch processing unit 145 sets an interrupt to input/output processing on files in the file server 140 to watch the input/output processing on the files. When a data access application 146 executes input/output processing 1310 on the image data 144, a file I/O interrupt 1320 is generated, causing the I/O watch processing unit 243 to check whether the executed input/output processing 1310 involves an update or a delete of a file concerned (step 1521).

When the input/output processing 1310 executed on the image data 144 involves an update or a delete, the I/O watch processing unit 243 checks whether or not the image data 144 subjected to the input/output processing 1310 is included in a file registered in the watched file list 148 (step 1522).

The I/O watch processing unit 243 transmits to the DBMS 103 an update notice 1330 indicating that the external file has been updated or deleted when the image data 144 is included in a file registered in the watched file list 148, and deletes information on the external file from the watched file list 148 when the external file has been deleted (step 1523). It should be noted that when the external file is referenced by a plurality of tables, columns and/or rows, the update notice 1330 is transmitted to all of them.

Figure 26:
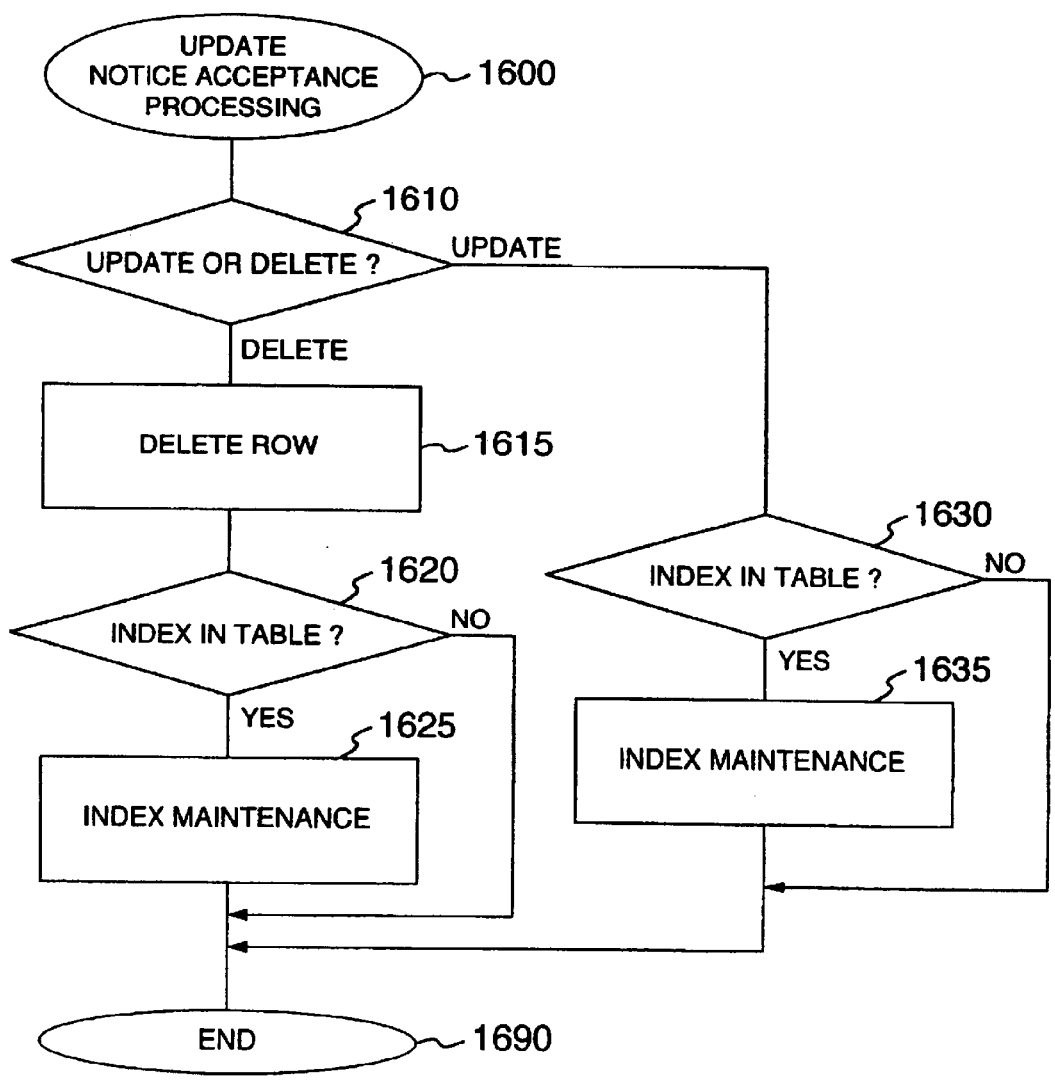
FIG. 26 is a flow chart illustrating a processing procedure for update notice acceptance processing in the embodiment of FIG. 24.

FIG. 26 is a flow chart illustrating a processing procedure for update notice acceptance processing according to this embodiment. Upon receipt of the update notice 1330 from the I/O watch processing unit 243, the DBMS 103 runs the update notice acceptance processing unit 206, forcing the update notice acceptance processing unit 206 to maintain respective information such that the integrity of the DB data 111 managed by the DBMS 103 is not damaged by the updated external file.

The update notice acceptance processing will be described below in greater detail. Since the update notice acceptance processing unit 206 is run when an external file has been updated or deleted, the update notice acceptance processing unit 206 first checks whether update or delete has been executed (step 1610).

When an external file has been deleted, the update notice acceptance processing unit 206 deletes a row corresponding to a deleted column value (step 1615), checks whether or not an index is registered in a table (step 1620), and instructs the index maintenance processing unit 213 to execute maintenance processing for the index if the index is registered in the table (step 1625).

When an external file has been updated, the update notice acceptance processing unit 206 checks whether or not an index is registered in a column which references the external file (step 1630), and instructs the index maintenance processing unit 213 to execute maintenance processing for the index if the index is registered in the column (step 1635).

Figure 27:
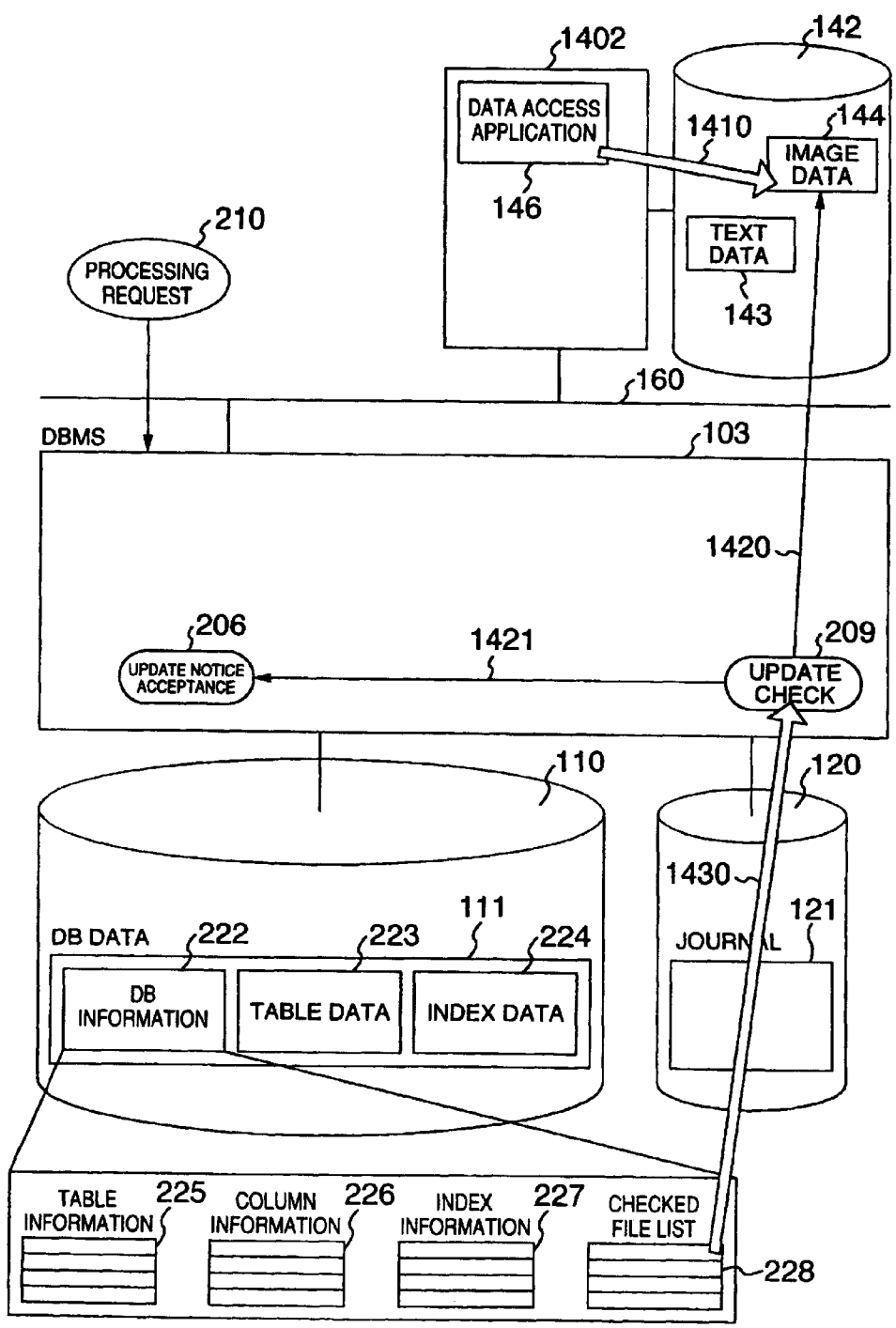
FIG. 27 illustrates an outline of update check processing in the embodiment of FIG. 1.

FIG. 27 illustrates an outline of update check processing according to this embodiment. FIG. 28 is a flow chart illustrating a processing procedure for the update check processing according to this embodiment. In the following, the processing performed by the update check processing unit 209 will be described with reference to FIGS. 27 and 28.

During insert processing or update processing on a table including a column of external file reference type, when an external file is inserted or updated as a file which is not under management of the DBMS update watch processing unit 145, the check initiation processing unit 207 registers the checked file list 228 in the DB information 222 contained in the DB data 111 with information on an external file subjected to the requested check, and a recent update time and next check time of the external file.

The update check processing unit 209 references the checked file list 228 to check whether a check time has reached for any external file (step 1551), and references an external file, the next check time of which has been passed by the current time, to acquire a recent update time of the external file (step 1552).

Then, the update check processing unit 209 compares the acquired recent update time with the preceding update time of the external file previously registered in the checked file list 228 (step 1553). If the acquired recent update time has passed the preceding update time, the update check processing unit 209 notifies the update notice acceptance processing unit 206 of an update notice indicating that the external file has been updated (step 1554), and registers the acquired recent update time again in the checked file list 228 (step 1555).

At step 1556, the update check processing unit 209 calculates the next check time for the external file from the watch frequency thereof, and registers the checked file list 228 with the calculated next check time (step 1556), and repeats a check on the checked file list 228 to see whether it came time to check any file (step 1551).

When the external file has been deleted so that its recent update time cannot be acquired at step 1552, the procedure proceeds from step 1553 to 1561 where the update check processing unit 209 notifies the update notice acceptance processing unit 206 of an update notice indicating that the external file has been deleted. Then, at step 1562, the update check processing unit 209 deletes external file information on the external file from the checked file list 228.

Upon receipt of the update notice 1421 from the update check processing unit 209, the update notice acceptance processing unit 206 performs external file update maintenance processing. As can be seen in FIG. 26, since the update notice acceptance processing unit 206 is run when an external file has been updated or deleted, the update notice acceptance processing unit 206 first checks whether an update or a delete has been executed on the external file (step 1610). When an external file has been deleted, the update notice acceptance processing unit 206 deletes a row corresponding to a deleted value (step 1615), checks whether or not an index is registered in a table (step 1620), and instructs the index maintenance processing unit 213 to execute maintenance processing for the index if the index is registered in the table (step 1625). On the other hand, when an external file has been updated, the update notice acceptance processing unit 206 checks whether or not an index is registered in the column (step 1630), and instructs the index maintenance processing unit 213 to execute maintenance processing for the index if the index is registered in the column (step 1635).

As described above, the database processing system according to this embodiment detects an update or a delete performed on any external file indicated by position information in column data within a database, and updates the column data within the database corresponding to processing performed on the external file, so that data within external files placed outside the database can be treated as data equivalent to ordinary column data stored in the database itself, resulting in an improvement in the integrity of the database.

Thus, according to the present invention, when an external file indicated by position information in column data within a database is updated or deleted, this processing is detected to update the column data within the data base corresponding to the processing performed on the external file, so that data within external files placed outside the database can be treated as data equivalent to ordinary column data stored in the database itself, resulting in an improvement in the integrity of the database.

What is claimed is:

1. A computer-implemented database processing method for performing definition and operation of external file reference type data which references data stored on an outside of a database, comprising the steps of:

at a time of inserting external file reference type data, receiving position information indicative of a storage location of an external file and watch information for watching the external file, and storing both said position and watch information in said database; and requesting a watch of the external file indicated by said position information according to said watch information.

2. A computer-implemented database processing method for performing definition and operation of external file reference type data which references data stored on an outside of a database, comprising the steps of:

at a time of searching external file reference type data, receiving a specification as to which one of column data and a content of an external file is to be fetched;

if the column data is specified, receiving position information indicative of a storage location of the external file and watch information for watching the external file as a search result; and if the content of the external file is specified, obtaining data stored in the location indicated by the position information, and receiving the data thus obtained as a search result.

3. A computer-implemented database processing method for performing definition and operation of external file reference type data which is references data stored on an outside of a database, comprising the steps of:
 at a time of updating external file reference type data, receiving update data and a specification as to which one of column data and a content of an external file is to be updated;
 if the column data is specified, sending a termination notice of terminating a watch of the external file according to watch information for watching data to be updated;
 re-writing position information indicative of a storage location of the external file and watch information for watching the external file, both the information having been received regarding the data to be updated as update data; and
 requesting a watch of the external file according to the watch information thus re-written; and
 if the content of the external file is specified, rewriting data stored in a location indicated by the position information with the update data thus received.

4. A computer-implemented database processing method for performing definition and operation of external file reference type date which references data stored on an outside of a database, comprising the steps of:
 at a time of deleting external file reference type data, receiving a specification as to whether a content of an external file is to be deleted;
 sending a termination notice of terminating a watch of the external file according to watch information of data to be deleted;
 deleting the data to be deleted; and
 if the content of the external file is specified, deleting data stored in a location indicated by position information.

5. A computer-implemented database processing method for performing definition and operation of external file reference type data which references data stored on an outside of a database, comprising the steps of:
 receiving a watch request for a watch of an external file, watching the external file thus requested, and, if the external file has been updated or deleted, sending an update note indicating update or deletion of the external file to a watch requester, and
 if a termination notice of terminating a watch of the external file is received, terminating the watch of the external file indicated by the termination notice.

6. The database processing method according to claim 5, wherein said step of sending the update notice to the watch requester includes a step of watching file processing performed at a location in which the external file is stored, and sending to the watch requester the update notice indicating update or deletion of the external file.

7. A computer-implemented database processing method for performing definition and operation of external file reference type data stored on a second file server which references data stored on an outside of a database stored on a first file server coupled to said second file server via a network, said method comprising the steps of:
 if the external file reference type data is inserted, receiving by said first file server a position information indicative of a storage location of an external file and watch information for watching said external file on said second file server, and storing both said position and watch information in said database on said first file server; and
 requesting a watch of said external file indicated by said position information according to said watch information from said first file server to said second file server.

8. A computer-implemented database processing method for performing definition and operation of external file reference type data stored on a second file server which references data stored on an outside of a database stored on a first file server coupled to said second file server via a network, said method comprising the steps of:
 if external file reference type data is searched, receiving by said first file server a specification as to which one of column data and a content of an external file is to be fetched;
 if said column data is specified, receiving by said first file server a position information indicative of a storage location of said external file and watch information for watching said external file as a search result; and
 if said content of the external file is specified, obtaining by said second file server data stored on said location indicated by said position information, and receiving by said first file server said data thus obtained as a search result.

9. A computer-implemented database processing method for performing definition and operation of external file reference type data stored on a second file server which references data stored on an outside of a database stored on a first file server coupled to said second file server via a network, said method comprising the steps of:
 at a time of updating external file type data, receiving by said first file server update data and a specification as to which one of column data and a content of an external file is to be updated;
 if said column data is specified, sending from said first file server to said second file server a termination notice of terminating a watch of said external file according to watch information for watching data to be updated;
 rewriting by said first file server a position information indicative of a storage location of said external file and watch information for watching said external file, both said information having been received regarding said data to be updated as update data; and
 requesting a watch of said external file according to said watch information thus re-written from said first file server to said second file server; and
 if said content of said external file is specified, rewriting by said second file server data stored in a location indicated by said position information with said update data thus received.

10. A computer-implemented database processing method for performing definition and operation of external file reference type data stored on a second file server which references data stored on an outside of a database stored on a first file server coupled to said second file server via a network, said method comprising the steps of:
 if external file reference type data is deleted, receiving by said first file server a specification as to whether a content of an external file is to be deleted;
 sending from said first file server to said second file server a termination notice of terminating a watch of the external file according to watch information of data to be deleted;

if the content of said external file is not specified, deleting by said first file server said data to be deleted from said database of said first file server;

if said content of the external file is specified, deleting by said second file server data stored in a location of said external file indicated by position information.

11. A computer-implemented data base processing method for performing definition and operation of external file reference type data stored on a second file server which references data stored on an outside of a database stored on a first file server coupled to said second file server via a network, said method comprising the steps of:

receiving by said second file server a watch request for a watch of an external file from said first file server, watching by said second file server said external file thus requested, and, if said external file has been updated or deleted on said second file server, sending from said second file server an update notice indicating update or deletion of said external file to said first file server; and if a termination notice of terminating a watch of said external file is received from said first file server, terminating said watch of said external file indicated by said termination notice.

12. The database processing method according to claim 11, wherein said step of sending said update notice to said first file server includes a step of watching by said second file server file processing performed at a location in which the external file is stored, and sending from said second file server to said first file server said update notice indicating update or deletion of said external file.

* * * * *